July 14, 1931.    W. WHALEY    1,814,067
SHOVELING MACHINE
Filed Nov. 30, 1929    19 Sheets-Sheet 7

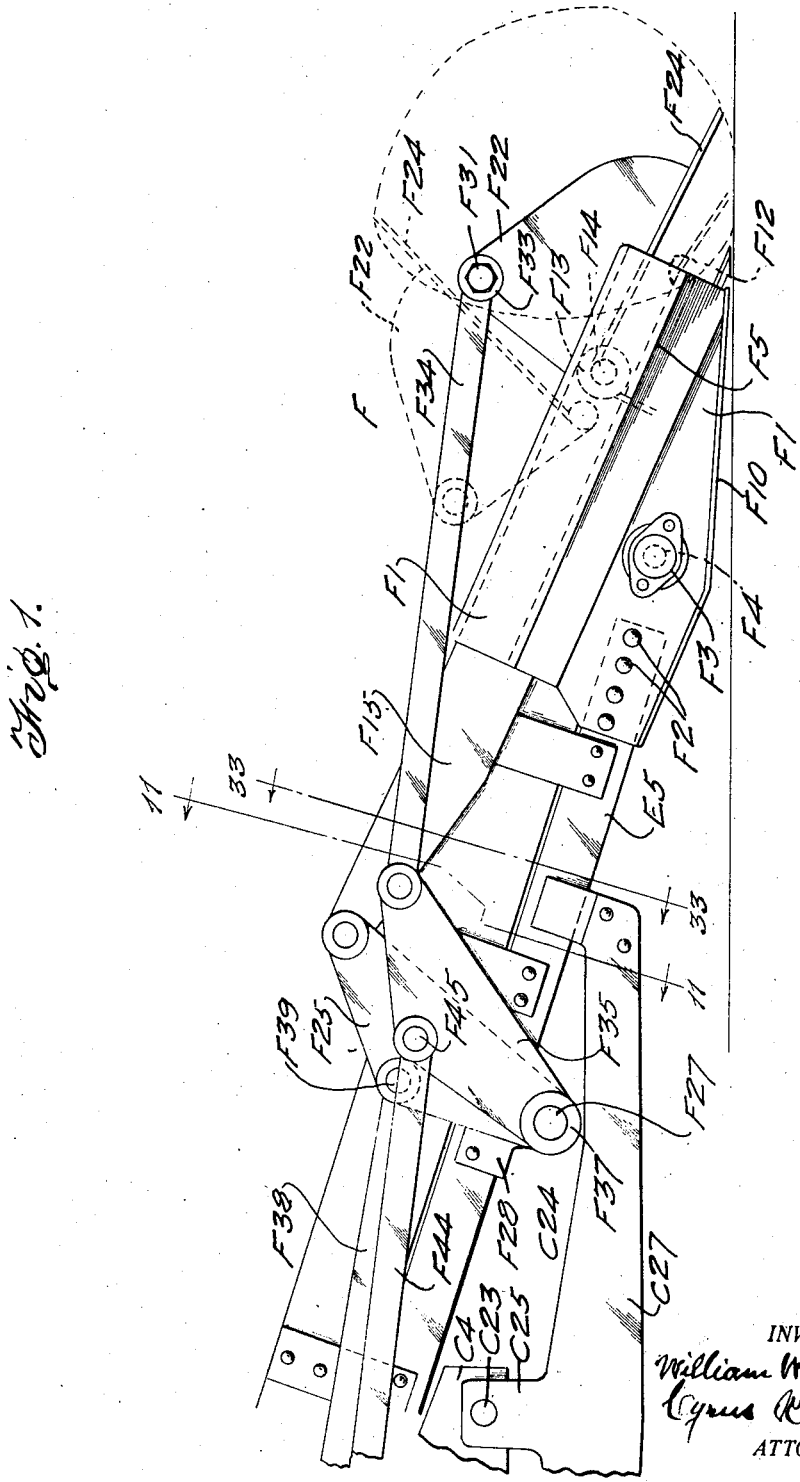

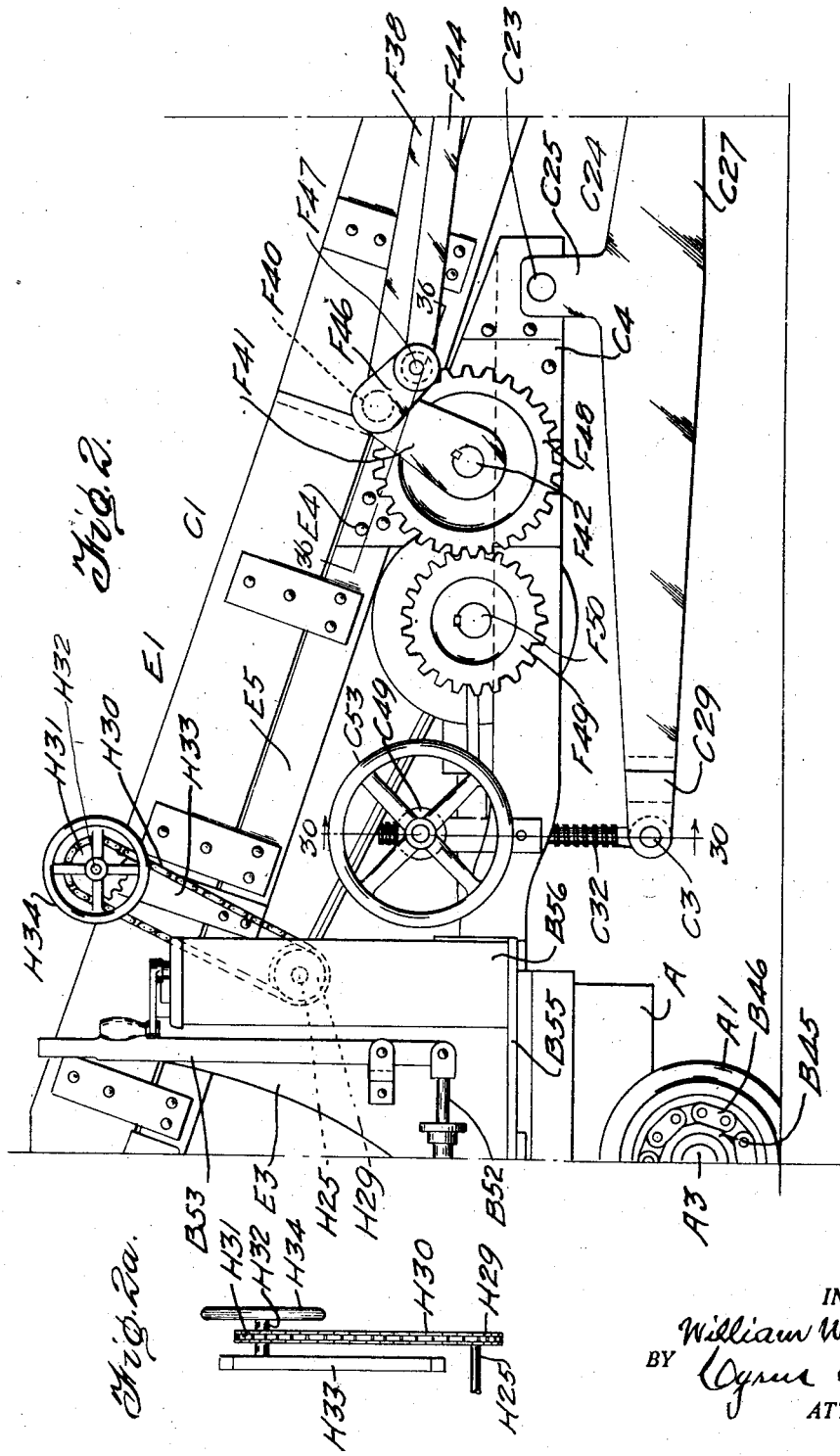

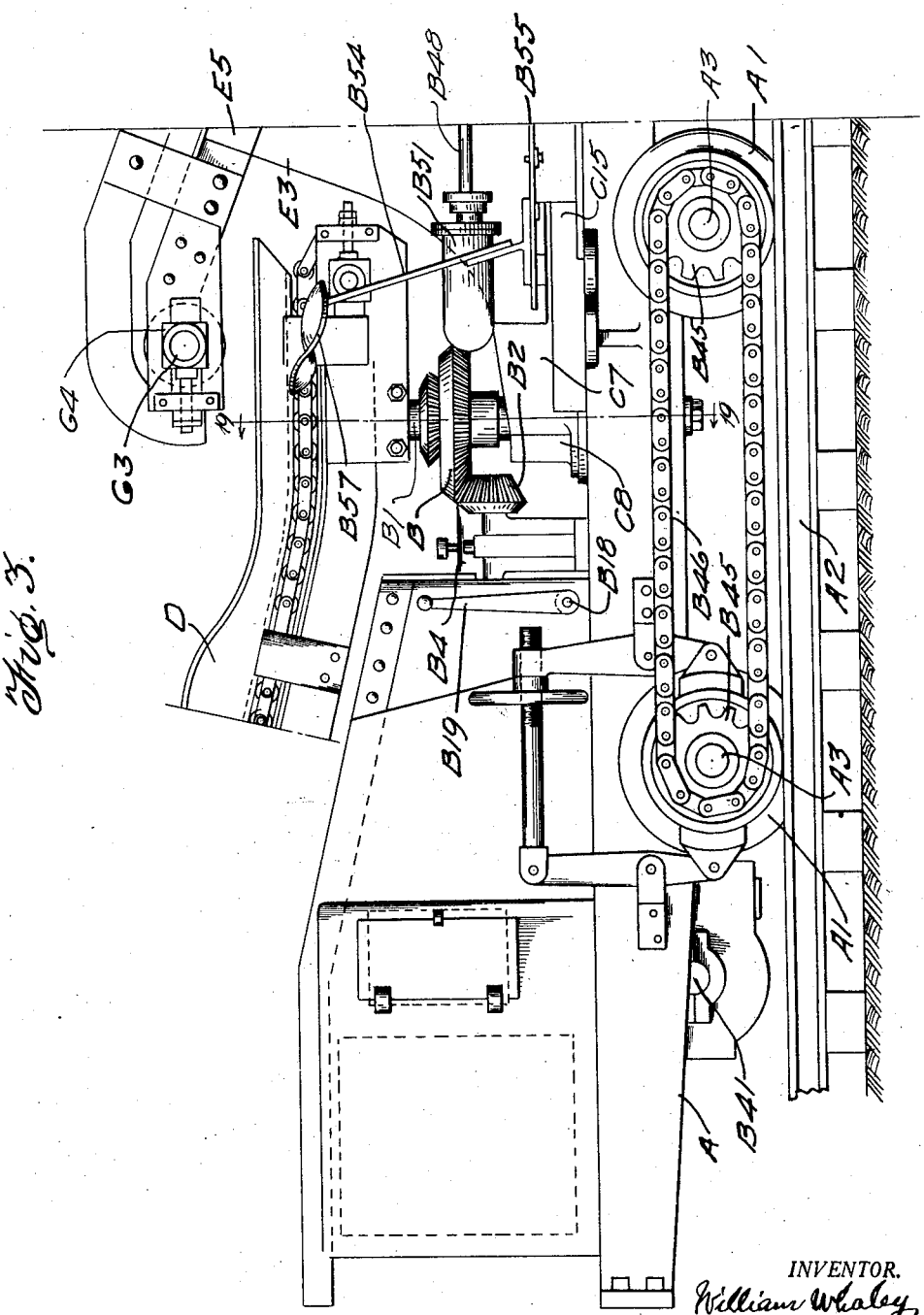

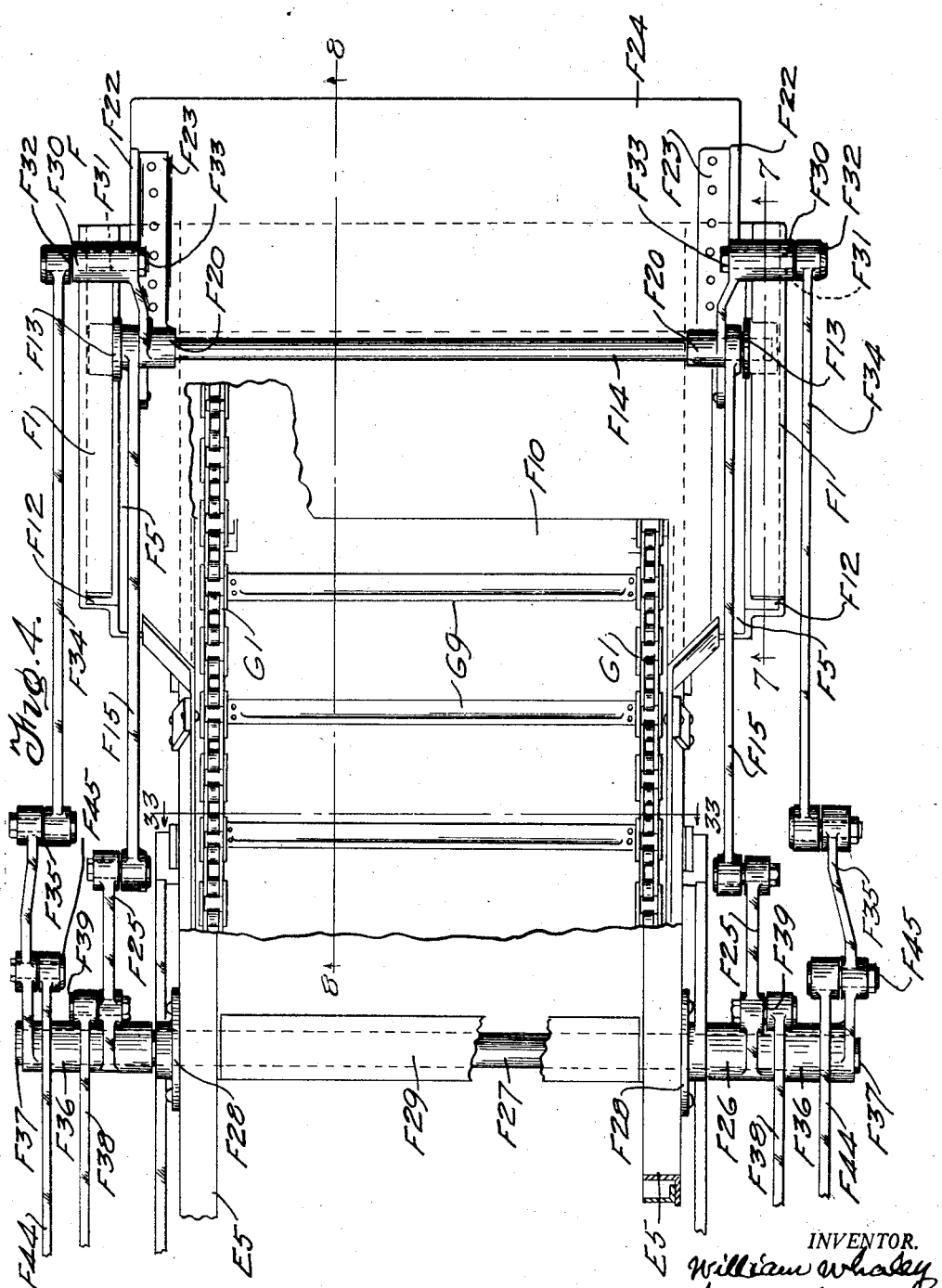

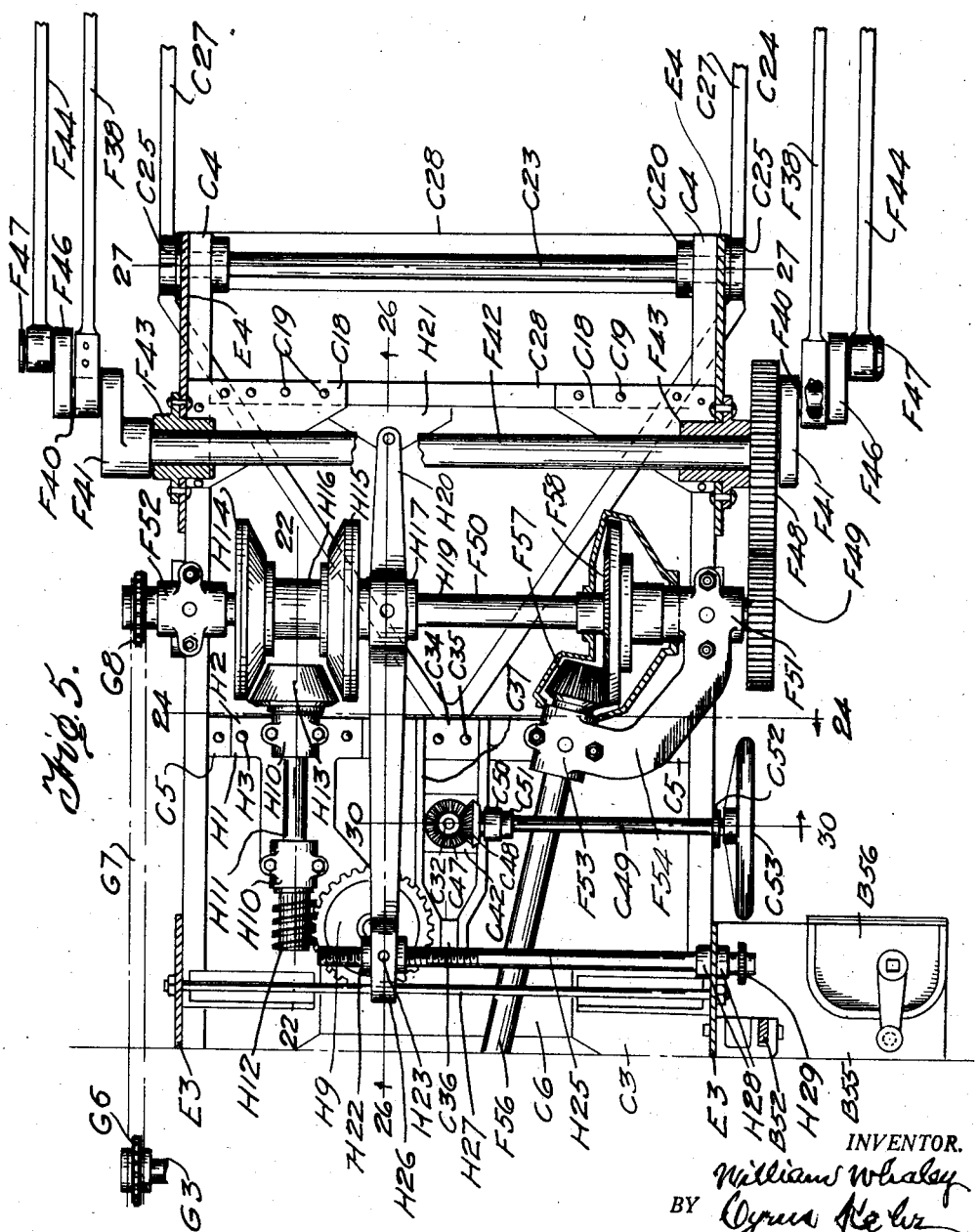

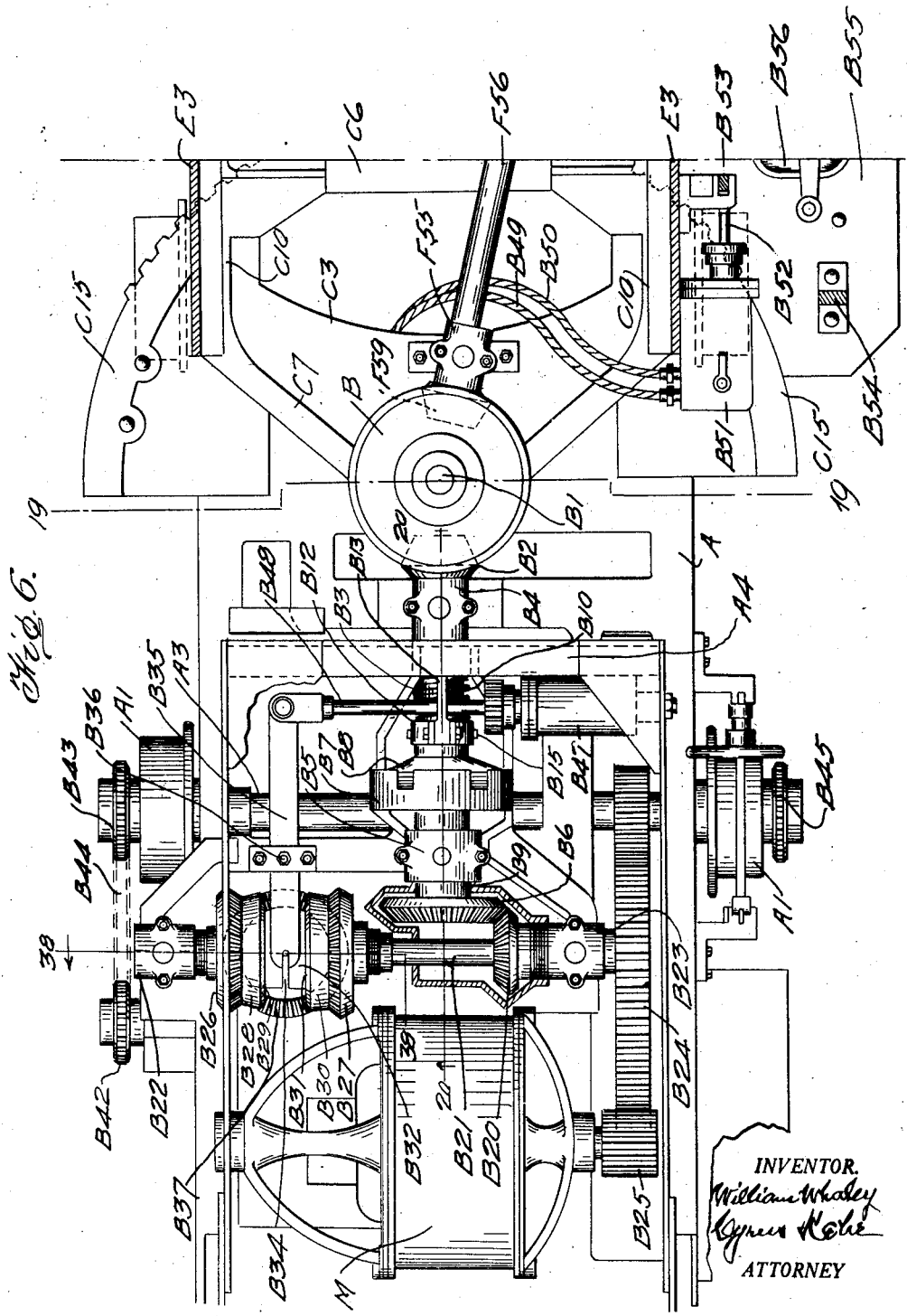

INVENTOR.
William Whaley
BY
ATTORNEY

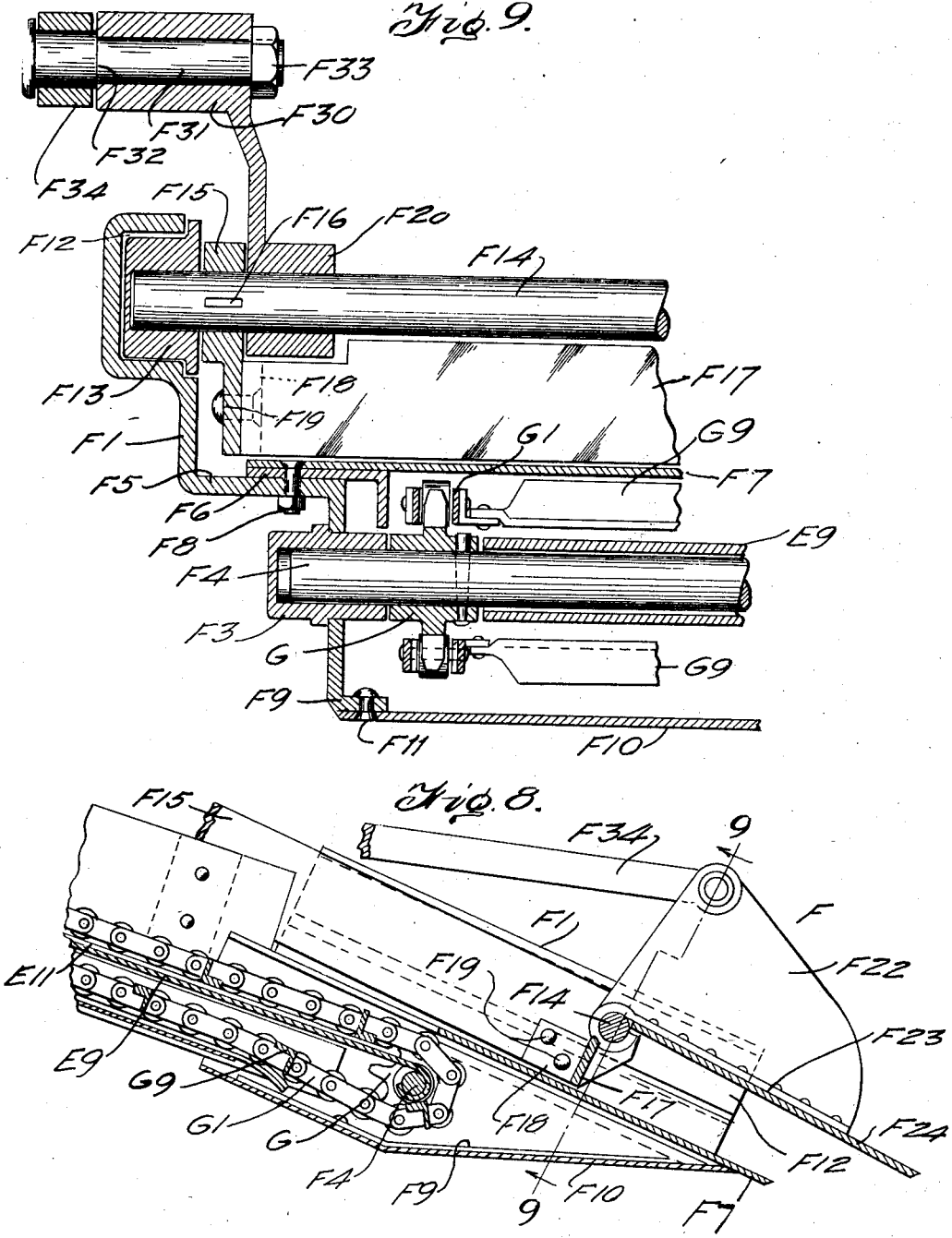

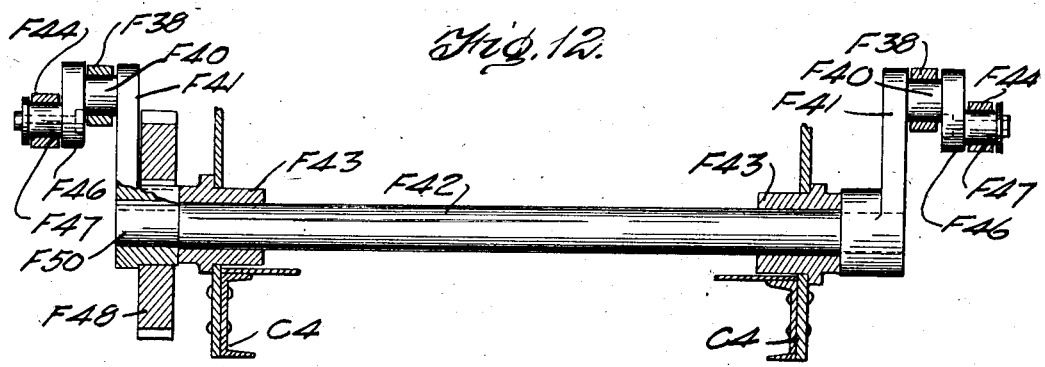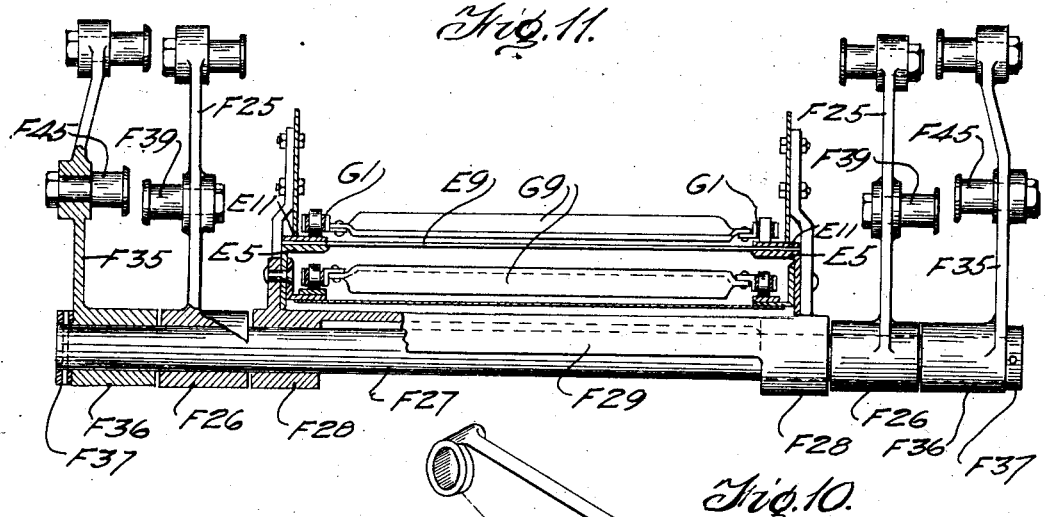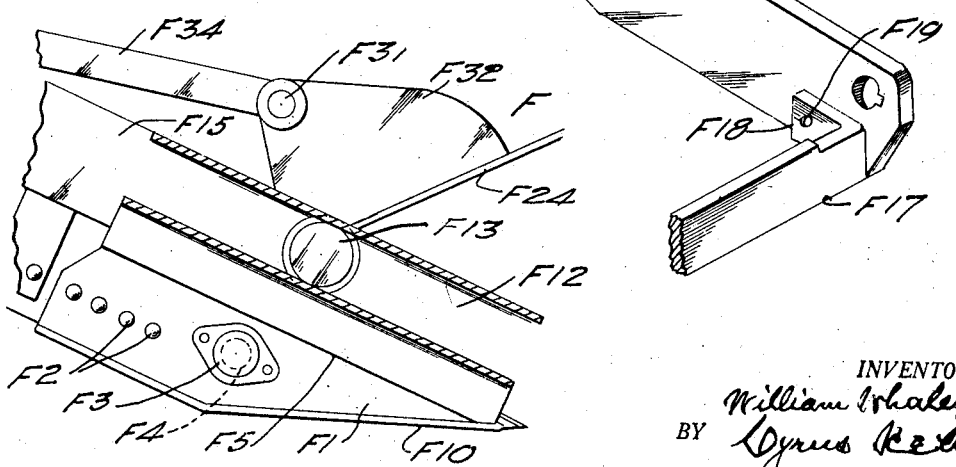

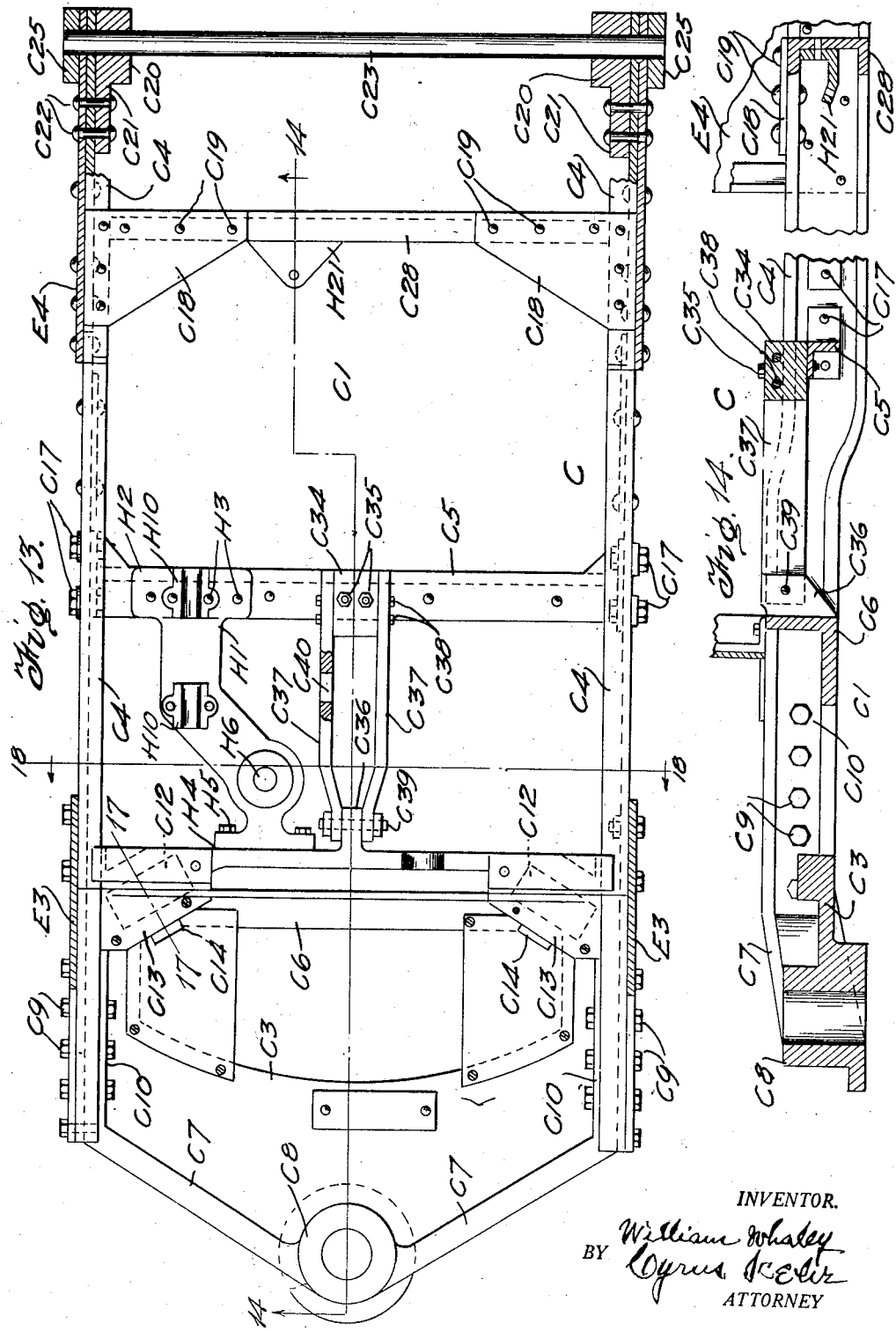

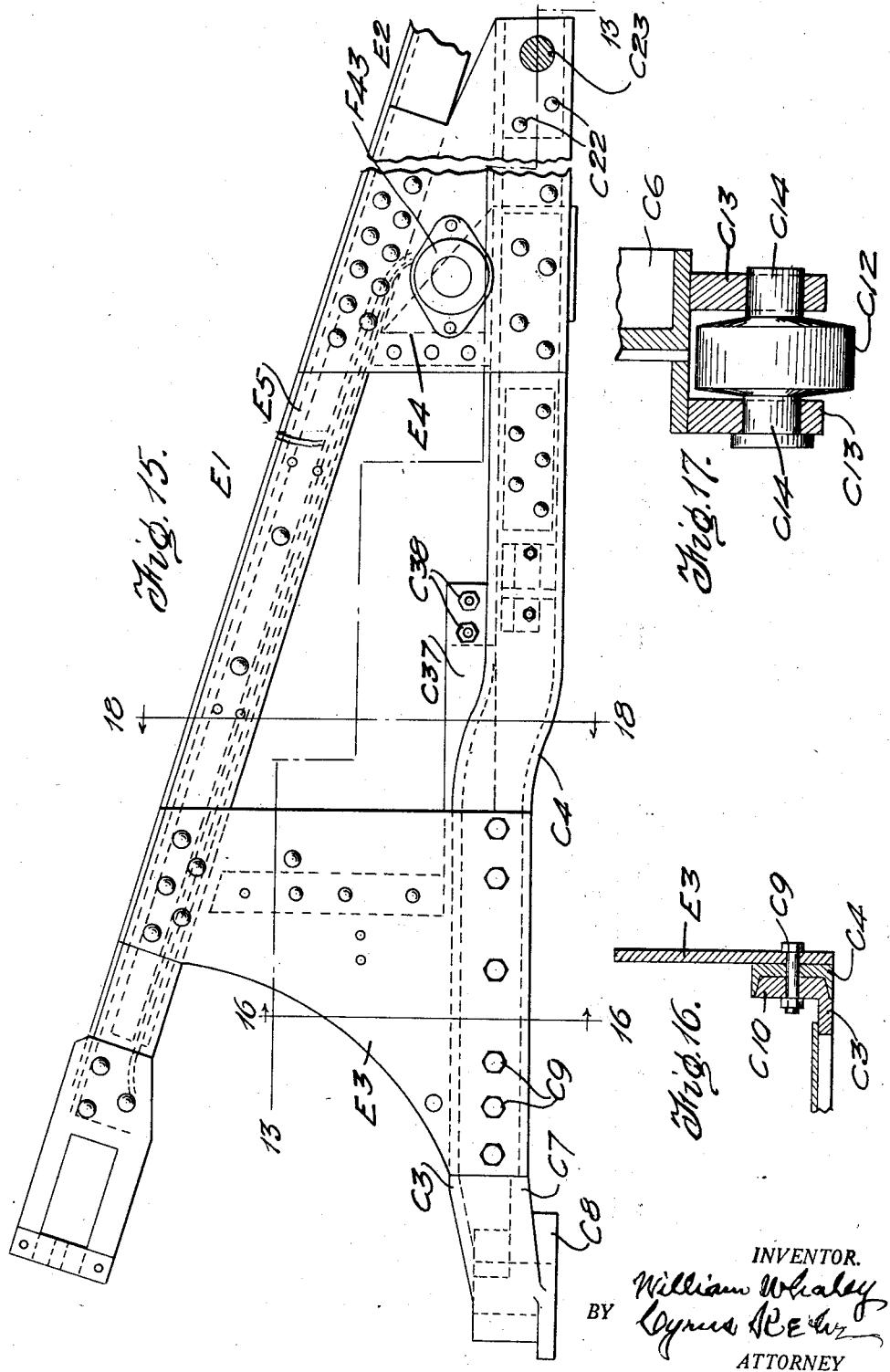

July 14, 1931.  W. WHALEY  1,814,067
SHOVELING MACHINE
Filed Nov. 30, 1929   19 Sheets-Sheet 12

INVENTOR.
William Whaley
BY Cyrus Kehr
ATTORNEY

July 14, 1931.    W. WHALEY    1,814,067
SHOVELING MACHINE
Filed Nov. 30, 1929    19 Sheets-Sheet 13
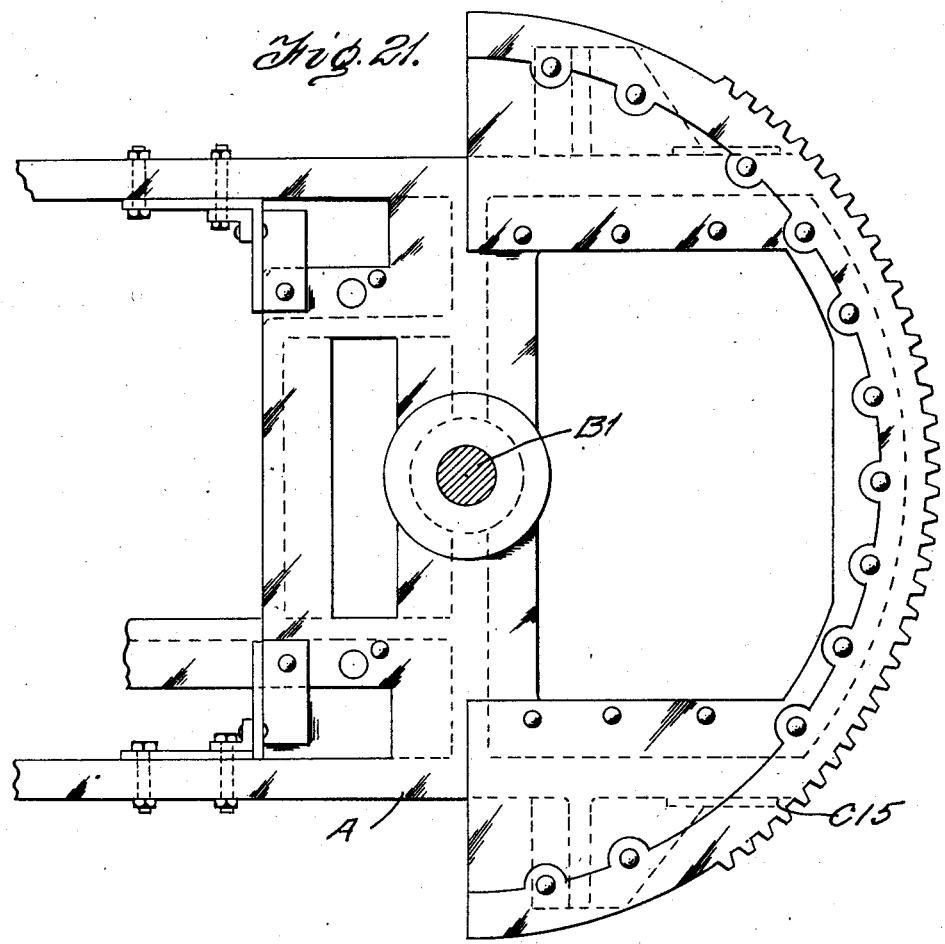
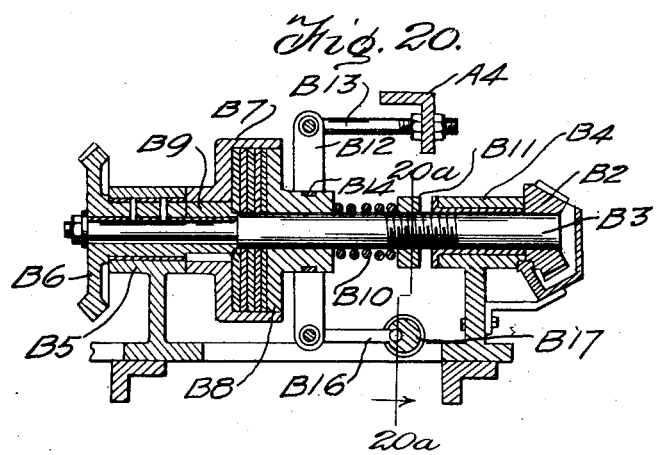
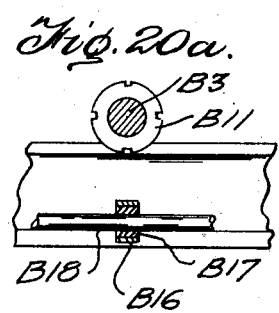

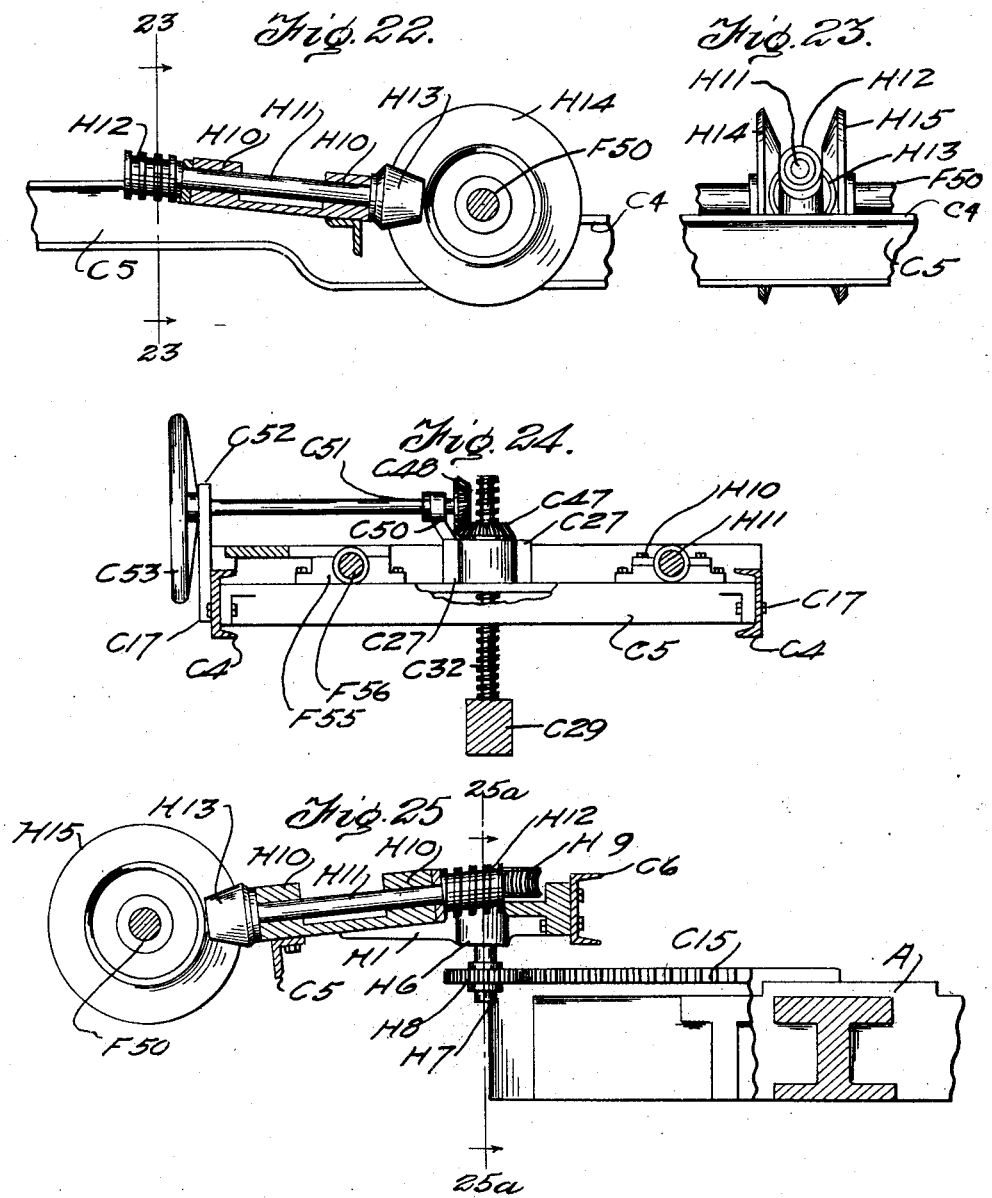

July 14, 1931.                W. WHALEY                1,814,067
                            SHOVELING MACHINE
                Filed Nov. 30, 1929        19 Sheets-Sheet 15
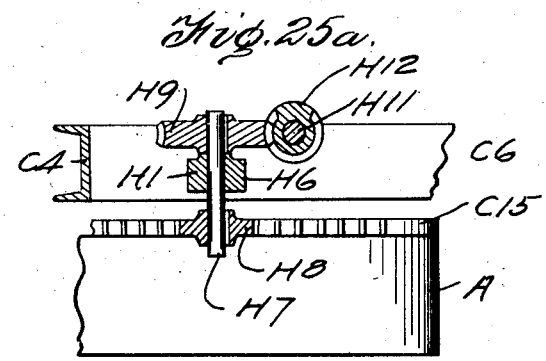
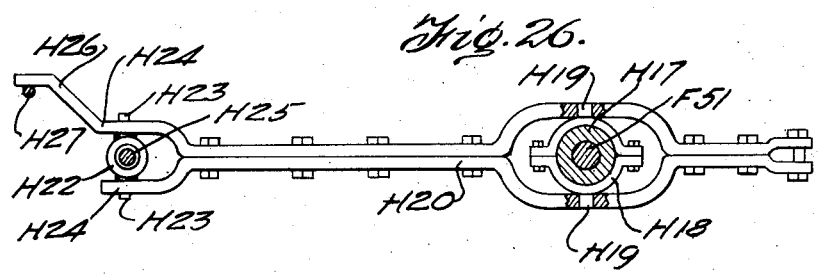
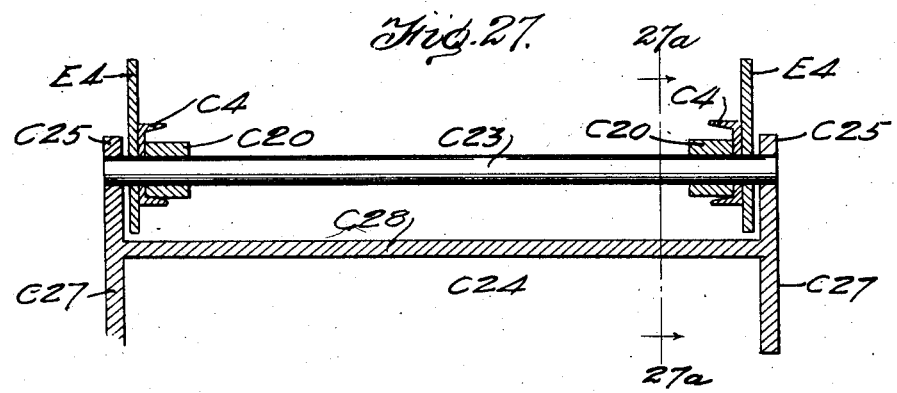
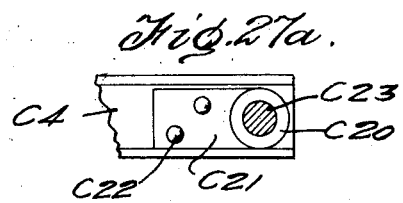
INVENTOR.
William Whaley
BY Cyrus Kehr
ATTORNEY

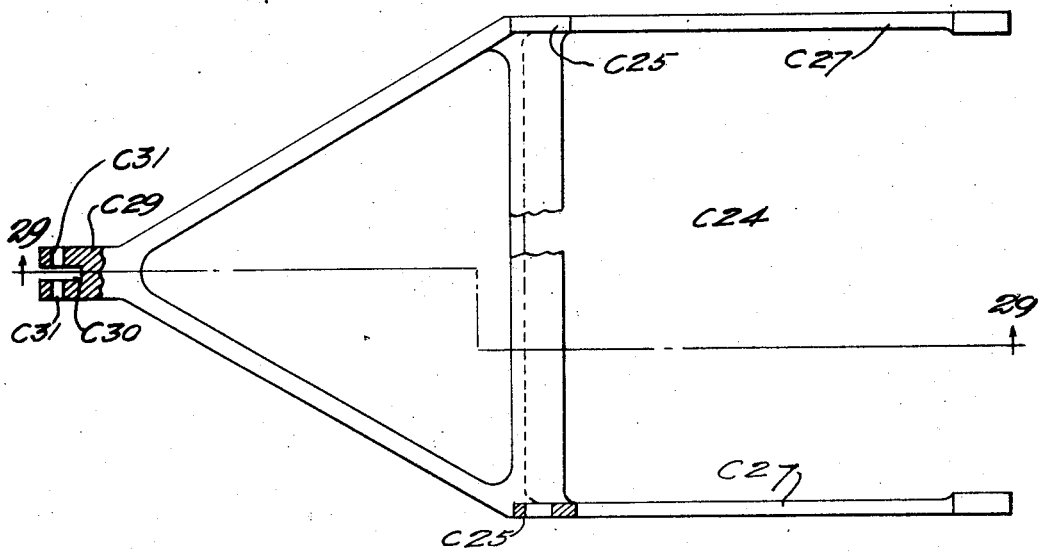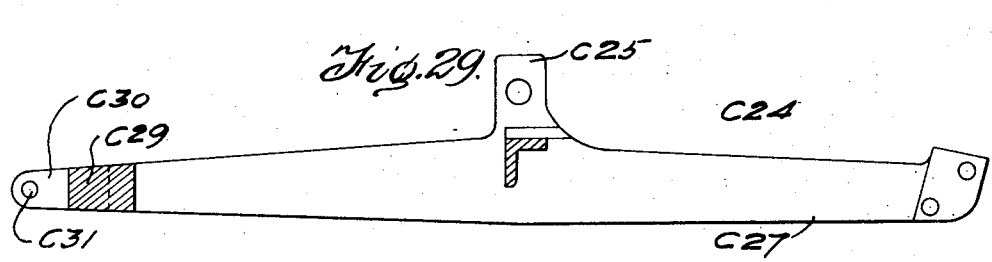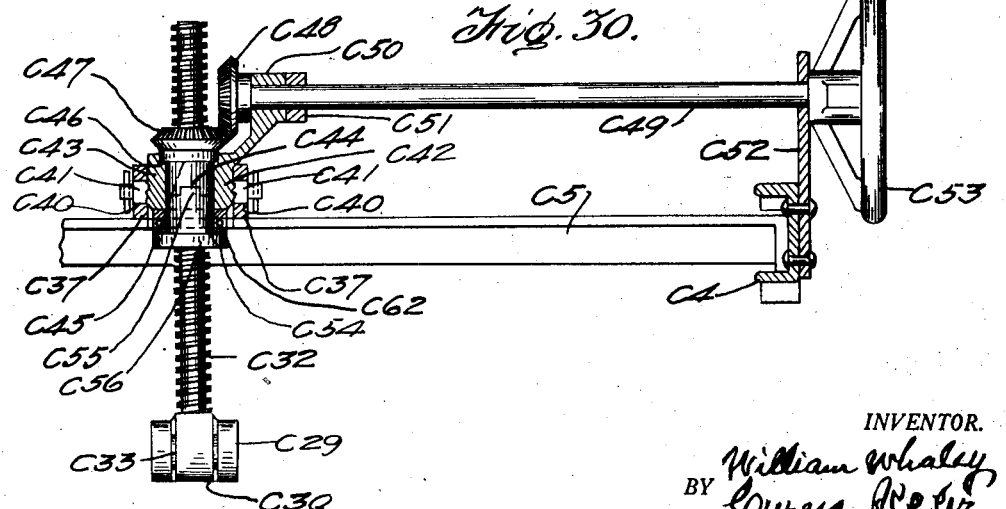

July 14, 1931.  W. WHALEY  1,814,067
SHOVELING MACHINE
Filed Nov. 30, 1929  19 Sheets-Sheet 17
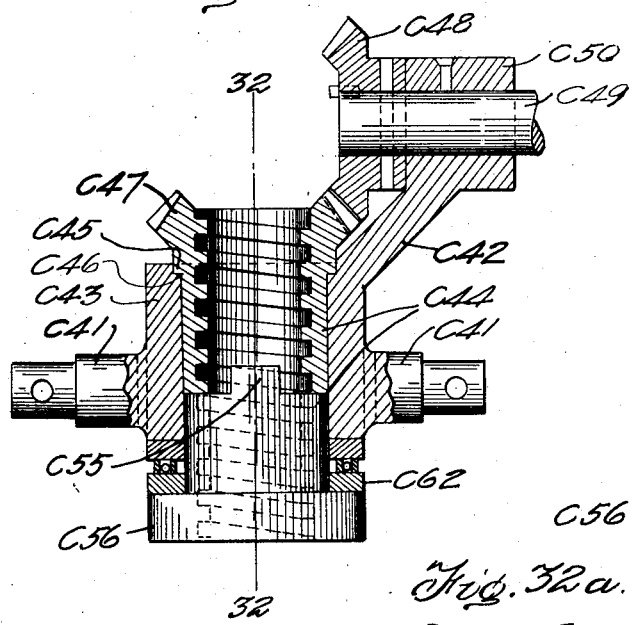
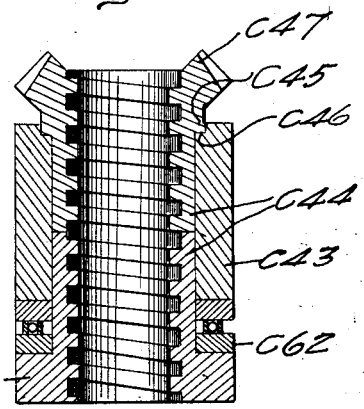
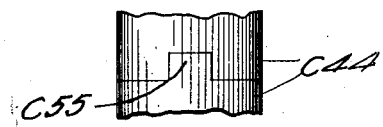
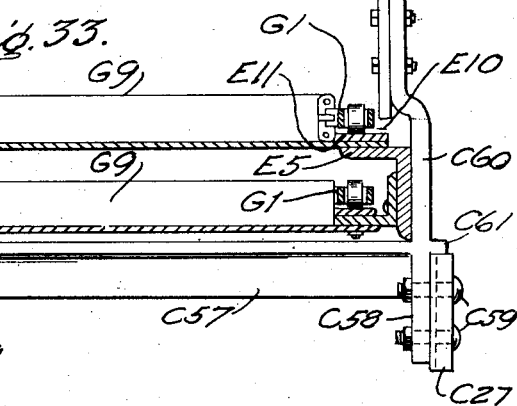
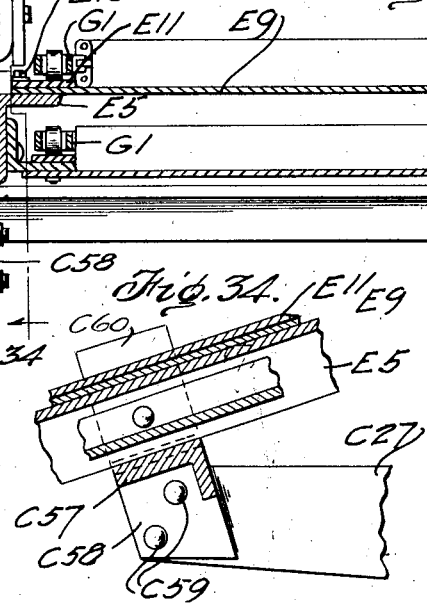
INVENTOR.
William Whaley
BY Cyrus Kehr
ATTORNEY

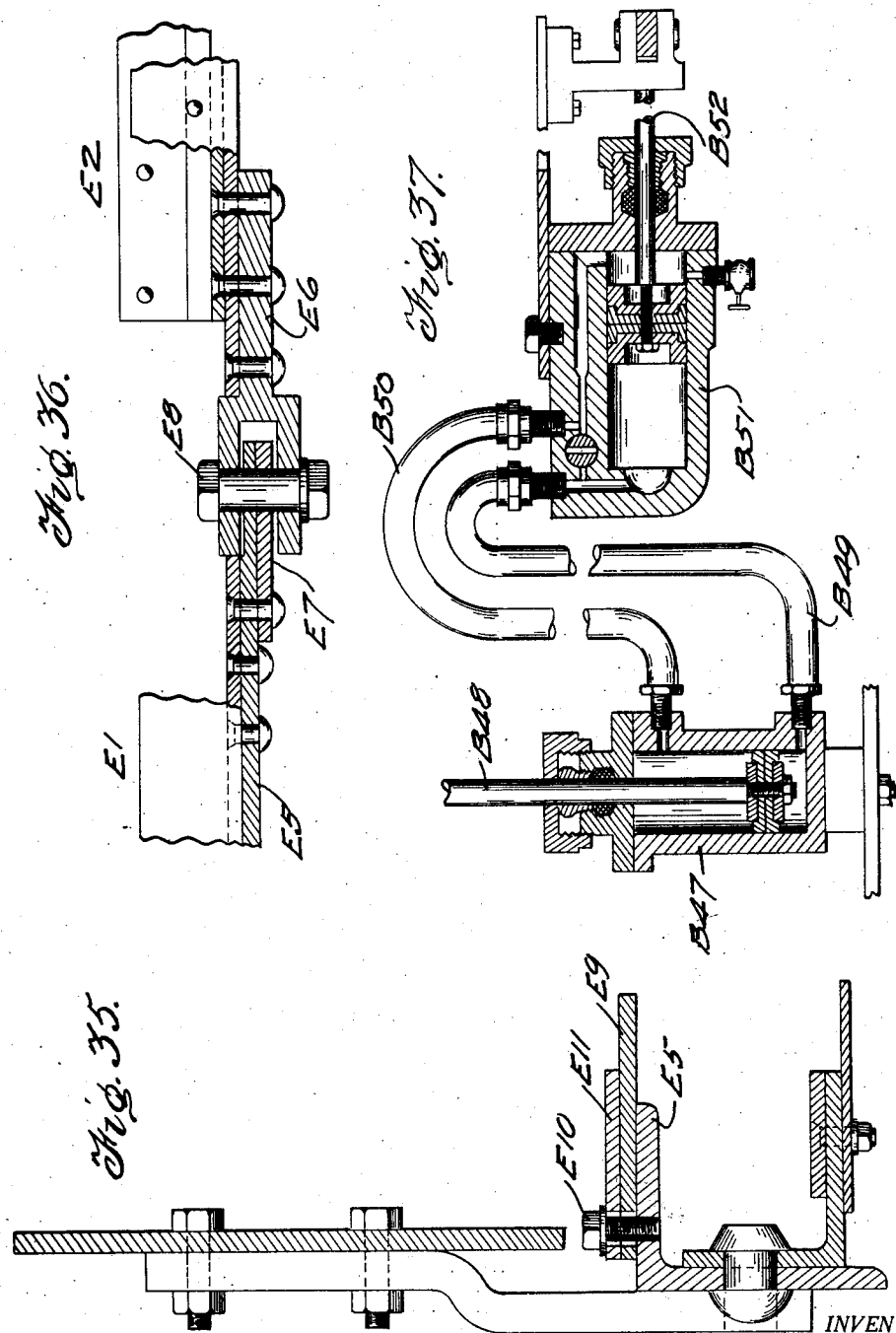

July 14, 1931.  W. WHALEY  1,814,067
SHOVELING MACHINE
Filed Nov. 30, 1929   19 Sheets-Sheet 19
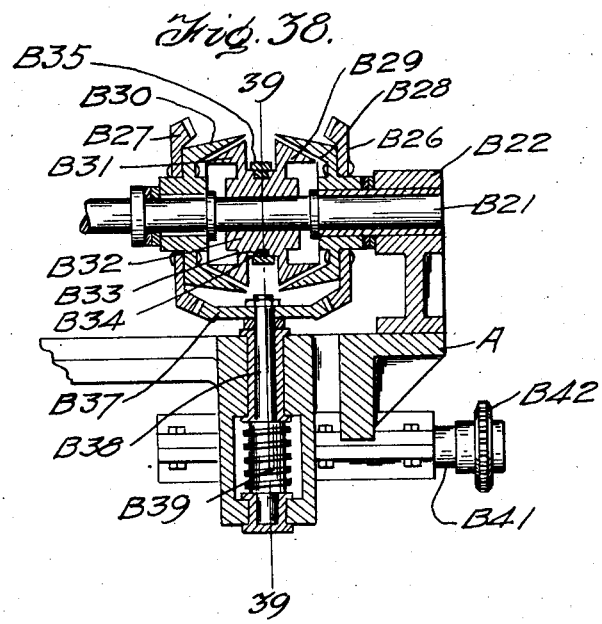
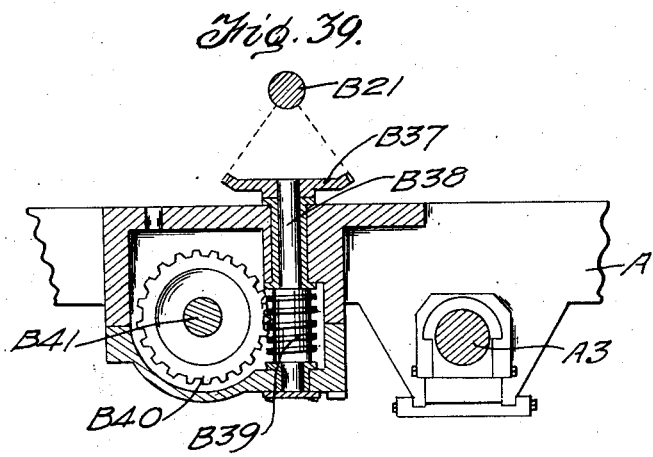
INVENTOR.
BY William Whaley
Cyrus Kehr
ATTORNEY Patented July 14, 1931

1,814,067

UNITED STATES PATENT OFFICE

WILLIAM WHALEY, OF KNOXVILLE, TENNESSEE

SHOVELING MACHINE

Application filed November 30, 1929. Serial No. 410,811.

This invention relates particularly to machines for shoveling coal, loose rock, and similar material. For machines of this general type, reference is made to my Letters Patent of the United States, No. 940,999, dated November 23, 1909, and No. 1,379,428, dated May 24, 1921.

The object of this invention is to produce a machine which embodies some of the features of both of the above-mentioned patents. One feature of the present machine includes the shovel and associated members formed and combined for continued rapid automatic action of the shovel to secure greatly increased capacity and in a manner preventing violent, disintegrating action of the shovel on the lading material. Another feature in the present machine is a lighter construction of the forward or jib part of the machine.
This lightness makes feasible a wider reach of the shovel without destroying the stability of the machine and allows effecting the various movements of the shovel with greater facility.
Furthermore, the structure of the shovel mechanism and the jib are adapted to manufacture at moderate cost.

The height of the forward end of the jib, whereon the shovel is supported, may be adjusted through a considerable range to allow the shovel to reach the floor or bottom on which the lading material rests. The jib has a wide lateral range. The conveyor belt on the jib discharges the material upon the rear or main conveyor. That conveyor is located on the body of the machine and is intended to discharge into a mine car or elsewhere. The body of the machine is supported on wheels, preferably rail track wheels, which may be turned by power for forward or backward movement of the machine, such movement being under the control of the operator. This propelling mechanism is used for moving the machine from place to place, preferably on rail tracks, and also for relatively short forward and backward movement, as may be needed, during the operation of the machine.

In the accompanying drawings, Figs. 1, 2 and 3, taken together, show an elevation of the right hand side of a machine embodying my improvement, Fig. 1 showing the forward part, Fig. 2 showing the middle part, and Fig. 3 showing the rear part of said elevation, the rear part of the rear conveyor being omitted;

Fig. 2a is a sectional detail of a part of the structure of Fig. 2;

Figs. 4, 5 and 6 are, respectively, plans of the parts of the machine shown in elevation by Figs. 1, 2 and 3;

Fig. 8 is a longitudinal upright section on the line, 8—8, of Fig. 4, the shovel being in lower forward movement, as in Fig. 1;

Fig. 8a is a detail view based on Fig. 7, the shovel being in its rear and tilted position;

Fig. 9 is an approximately upright section on the line, 9—9, of Fig. 8, looking toward the left;

Fig. 10 is a detail perspective of one of the shovel connecting plates and a part of a plate-form cross member which joins that connecting plate and the companion connecting plate;

Fig. 11 is an approximately upright section on the line, 11—11, of Fig. 1, looking toward the left, some parts being omitted and some parts being broken, this showing the bell cranks through which the shovel is controlled;

Fig. 12 is an approximately upright section along the crank shaft shown in the right hand part of Fig. 2, and in the right hand part of Fig. 5;

Fig. 13 is a sectional plan on the line, 13—13, of Fig. 15, showing the rear jib section separated from other parts;

Fig. 14 is an upright, longitudinal section on the line, 14—14, of Fig. 13, looking in the direction of the arrows;

Fig. 15 is an elevation showing the structure of Figs. 13 and 14 with the addition of the rear support of the jib conveyor;

Fig. 16 is an upright section on the line,

Figure 18:
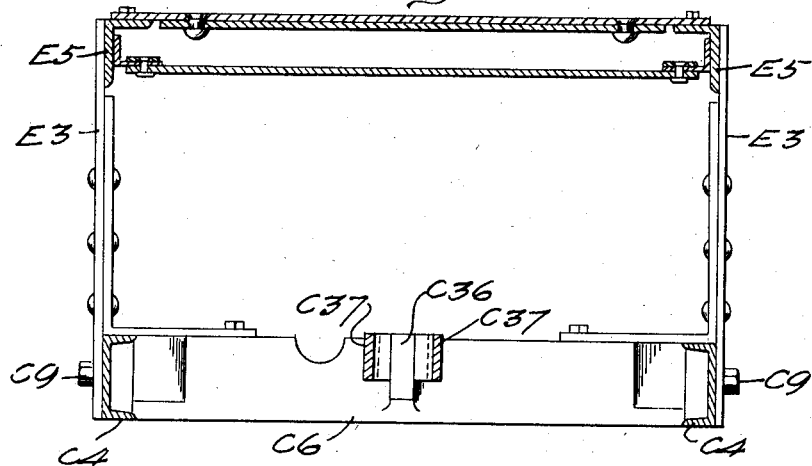
Figure 19:
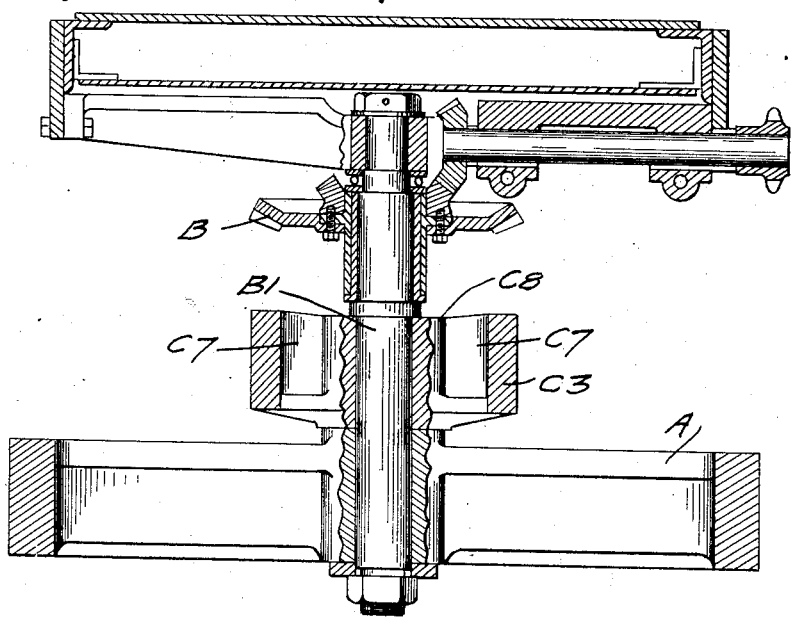

16—16, of Fig. 15, looking toward the right;

Fig. 17 is an upright section on the line, 17—17, of Fig. 13;

Fig. 18 is an upright section on the line, 18—18, of Fig. 15, looking toward the left;

Fig. 19 is an upright section on the line, 19—19, of Figs. 3 and 6;

Fig. 20 is a longitudinal upright section on the line, 20—20, of Fig. 6, looking in the direction of the arrow;

Fig. 20a is an upright section on the line, 20a—20a, of Fig. 20, looking toward the right;

Fig. 21 is a plan of the forward part of the machine body, the segment gear being in place on said body;

Fig. 22 is a longitudinal section on the line, 22—22, of Fig. 5, looking in the direction of the arrow;

Fig. 23 is an upright section on the line, 23—23, of Fig. 22, looking toward the right;

Fig. 24 is an upright transverse section on the line, 24—24, of Fig. 5, looking toward the left;

Fig. 25 is a longitudinal upright section on the line, 22—22, of Fig. 5, looking in the direction opposite the direction of the arrow;

Fig. 25a is an upright section on the line, 25a—25a, of Fig. 25, looking toward the right;

Fig. 26 is a longitudinal section on the line, 26—26, of Fig. 5, looking in the direction of the arrow;

Fig. 27 is a transverse upright section on the line, 27—27, of Fig. 5, looking toward the right;

Fig. 27a is an upright section on the line, 27a—27a, of Fig. 27, looking toward the right;

Figs. 28 and 29, are, respectively, a plan and a longitudinal section of the jib yoke separated from each other, the section (Fig. 29) being on the line, 29—29, of Fig. 28;

Fig. 30 is an upright transverse section on the line, 30—30, of Figs. 2 and 5, looking toward the right;

Figs. 31 and 32 are detail views of a nut and gears shown in the left hand part of Fig. 30, Fig. 32 being a section on the line, 32—32, of Fig. 31;

Fig. 32a is a detail elevation of a part of the nut shown in Figs. 31 and 32;

Fig. 33 is an upright, transverse section on the line, 33—33, of Figs. 1 and 4, looking toward the left;

Fig. 34 is a detail section on the line, 34—34, of Fig. 33, looking toward the left;

Fig. 35 is an enlarged detail section through one side of the conveyor frame, on the line, 33—33, of Figs. 1 and 4;

Fig. 36 is a detail section on the line, 36—36, of Fig. 2, illustrating the joint by which the forward conveyor structure and the rear conveyor structure of the jib are hinged to each other, the cranks and spur gear wheel being omitted from the section;

Fig. 37 is a sectional plan showing a pair of hydraulic cylinders and flexible tubes joining said cylinders;

Fig. 38 is a detail section on the line, 38—38, of Fig. 6;

Fig. 39 is a detail section on the line, 39—39, of Fig. 38.

The machine consists of five principal sections or groups of mechanical members, (1) the main frame or body, A; (2) the transmission mechanism, B, on the body, A; (3) the rear conveyor, D; (4) the jib, C; and (5) the shovel, F.

The main frame or body, A, is supported on four ordinary wheels, A1, adapted to rest on ordinary track rails, A2, or on the ground or floor. (Fig. 3.) These wheels support axles, A3. The rear part of the jib, C, is swiveled on an upright axis on the main frame, A. Forward of said upright axis, the jib rests on a horizontal track which is supported on the main frame and is concentric with said upright axis.

The jib consists of a rear section and a forward section jointed to the rear section. On the jib are a forward endless conveyor apron and associated parts. In front of the apron and supported on the forward end of the jib is a shovel. The rear part of the shovel is supported on an axis which is horizontal and at right angles to the length of the jib. The forward conveyor apron extends from the rear of the shovel rearward and upward to or nearly to the upright axis on which the jib turns. The forward end of the rear conveyor, D, is under the rear end of the forward conveyor apron and extends thence rearward beyond the rear end of the main frame or body of the machine any distance suitable for discharge into a car placed at the rear of the machine. Fig. 3 of the drawings shows the rear part of this conveyor broken away. That conveyor is not concerned with the present invention.

*The shovel*

At the forward end of each side rail, E5, of the forward frame section, E2, of the jib, a steel side casting, F1 (Figs. 1, 8 and 9) is attached to the outer face of said rail by means of four bolts or rivets, F2. The rear end of the lower edge of each casting, F1, is extended obliquely downward nearly to the floor plane, and then forward almost parallel to the floor plane until the forward end of said edge substantially reaches the floor plane.

Immediately forward of the ends of the side rails, E5, each of said castings has a bearing, F3. Each of said bearings receives one end of a horizontal shaft, F4, for the forward end of the forward conveyor, as will be described further on. Above each bearing, F3, the adjacent part of the casting, F1, is extended horizontally outward to form a horizontal seat, F5, which forms a support for an angle-form bar, F6, and a cross plate, F7, extending from the seat, F5, of one casting, F1, to the seat, F5, of the other casting, F1. Bolts or rivets, F8, extend through the cross plate, F7, and the angle bar, F6, and the horizontal part of the casting, F1, whereby said members are bound to each other. By means of the plate, F7, the castings, F1, are given support or stability in addition to the support or stability received by attachment to the forward ends of the rails, E5.

Each such lower edge of each plate, F1, is turned inward (toward the other plate) to form a flange, F9. A bottom plate, F10, extends from one plate, F1, to the other and has its side edges applied to the lower face of the flange, F9, and secured to said flange by means of bolts or rivets, F11. This bottom plate, F10, protects the lower part of the forward end of the conveyor and also adds stability to the castings, F1, F1. To attain yet more stability, the forward edges of the bottom plate, F10, and the cross plate, F7, may be joined to each other by riveting or welding.

At the outer limit of the flange, F5, of each side casting, F1, the casting is extended upward and is provided with a channel, F12, extending lengthwise of the casting and approximately parallel to the rails, E5, but in an upright plane which is outward of the plane of the adjacent rail, E5. In each of said channels is a roller, F13, adapted to roll in and along the length of the adjacent channel. Each of said rollers receives one end of a horizontal shaft or axle, F14. Adjacent each roller, F13, the shaft, F14, is surrounded by the forward end of a connecting plate, F15, which functions as a connecting rod, as will be described further on.

Each connecting plate is joined immovably to the shaft, F14, by means of a key, F16, whereby said shaft is held against rotation. Said plate extends downward below the shaft, F14. A plate-form cross member, F17, extends from one connecting plate, F15, to the other and has each end turned to form an extension, F18, at right angles to bear flatwise against the inner face of the connecting plate, F15. Bolts or rivets, F19, join said extension, F18, to the adjacent connecting plate, F15. The connecting plate, F15, is reciprocated endwise, as will appear further on. Through the connections between said plates and the cross member, F17, said cross member is made to reciprocate in unison with the connecting plates, F15.

Adjacent the inner face of each connecting plate, F15, a shovel bearing, F20, loosely surrounds the shaft, F14. Each of said bearings forms a part of and is rigid with the shovel, F. From each bearing, F20, there rises an approximately upright shovel side, F22, and each such side extends forward from said bearing. Each of said sides has a lower flange, F23, directed toward the opposite shovel side. A shovel bottom, F24, extends forward from the shaft, F14, and beneath each flange and forward of said flanges and is riveted to said flanges. Thus the shovel is made a rigid structure turnable on the shaft, F14.

In the form shown in the drawings, the cross plate, F7, extends forward and overlaps the forward end of the bottom plate, F10.

The cross member, F17, extends downward close to the upper face of the cross plate, F7, and the cross member, F17, extends upward close to the lower face of the shaft, F14. At each end of the cross member, F17, its upper edge is cut away to make room for the lower part of the shovel bearing, F20. Thus the cross member, F17, forms a partition or barrier extending downward from the shaft, F14, to the cross plate, F7. Said cross plate is reciprocated with the connecting plates, F15, and the shaft, F14, and the shovel, F, during the endwise reciprocations of the connecting plates, F15. From the foregoing, it will be seen that the forward ends of the connecting plates, F15, are hung on or supported by the shaft, F14, and are carried by said shaft during the reciprocations of the connecting plates, the shaft being carried by the rollers, F13, and the travel of the rollers and the shaft being limited to the course defined by the channels, F12, in the side castings, F1. The rear end of each connecting plate, F15, is coupled to the upper end of an adjacent bell crank, F25. The lower end of each bell crank has a hub, F26, loosely surrounding the adjacent end of the shaft, F27, supported in hangers, F28, attached to the side rails, E5. The hangers, F28, are joined to each other by the bridge member, F29, cast unitary with the hangers and located above and spaced from the shaft, F27. Through this connection additional stability is given to the jib side rails, E5. Each hanger, F28, forms an abutment for the adjacent hub, F26.

The sides, F22, of the shovel, F, are of approximately triangular form, one angle being at the transverse, shovel-supporting shaft, F14, and another angle being at the forward end of the side and the third angle being above the shaft, F14. At said upper angle at each side, F22, a bearing, F30, extends outward on an axis which is horizontal and transverse to the length of the jib. A wrist pin, F31, extends through said bearing and has a shoulder, F32, resting against the outer end of said bearing. A nut, F33, on the wrist pin at the opposite end of the bearing secures said pin. The forward end of a connecting rod, F34, engages said wrist pin. The rear end of said connecting rod is coupled to the upper end of an upright bell crank, F35, the lower end of which has a hub, F36, loosely surrounding the shaft, F27, beside the hub, F26, of the bell crank, F25. A retaining ring, F37, surrounds and is secured to the end of said shaft beside the hub, F36, whereby the hubs, F36 and F26, are retained on said shaft.

At each side of the jib, the bell crank, F25, is coupled to a pitman rod, F38, which has its forward end coupled to a wrist pin, F39, approximately midway between the ends of the bell crank, F25. The rear end of the pitman rod, F38, is coupled to a wrist pin, F40, on the crank, F41, fixed on the shaft, F42, extending transversely across the rear jib section and rotatable in bearings, F43, secured to the upright plate, E3, rising from the metal channel side rail, C4. The bell crank, F35, is in like manner placed into operative relation with the shaft, F42, by means of a pitman rod, F44, the forward end of said pitman rod being coupled to a wrist pin, F45, intermediate the ends of the bell crank, F35, and the rear end of the rod, F44, being coupled to the wrist pin, F47, of the secondary crank, F46, supported on the wrist pin, F40, of the main crank, F41. The wrist pins, F40 and F47, move in unison during the turning of the shaft, F42, because the secondary crank, F46, is supported rigidly on the main crank, F41, through the wrist pin, F40. Furthermore, the said two wrist pins are equidistant from the axial line of the shaft, F42. Hence the rotation of the shaft will carry said wrist pins in the same circular orbit. Therefore each rotation of the shaft, F42, will give the pitman rods, F38 and F44, the same length of throw. But the secondary crank is so set as to place the wrist pin, F47, in advance of the wrist pin, F40, during the travel of said pins in said oribital path. Therefore the beginning of the forward throw of the pitman rod, F44, precedes the beginning of the forward throw of the pitman rod, F38. In other words, the reciprocation of the rod, F38, lags behind the reciprocation of the rod, F44. The reciprocation of the rod, F38, causes the rocking of the bell crank, F25, whereby the connecting plates, F15, are reciprocated for carrying the shaft, F14, and the shovel, F, bodily forward and backward, that movement being guided by the channels, F12. Simultaneously with that movement, the pitman rod, F44, tilts the bell crank, F35, whereby the pitman rod, F34, is made to tilt the shovel on the shaft, F14.

These two movements are so timed and related as to cause the shovel to take positions to be pushed under the coal or other material along the floor and be changed to tilted position for allowing the material to slide backward on the shovel and upon the forward part of the conveyor, the bodily forward and backward movement of the shovel being accomplished by the rocking of the bell cranks, F25, and the tilting of the shovel being accomplished by the rocking of the bell cranks, F35. The forward edge or lip of the shovel—the forward edge of the shovel bottom, F24, moving in an orbital path, as indicated by the dotted line in Fig. 1 of the drawings. It will be observed that the lower part of said orbit is approximately horizontal and that that part represents forward movement of the shovel independently of forward movement of the entire machine. It is to be understood that the entire machine may also be driven forward bodily by means of power applied to the track wheels, A1, as described herein under the head "Driving the track wheel axles".

Referring again to the plate-form cross member, F17, (Figs. 8, 9 and 10), it is to be remembered that that member is reciprocated in unison with the shaft, F14, and the shovel, F, and that said cross member is so located as to form a partition substantially closing the space between the shaft, F14, and the horizontal cross plate, F7. Thus when the shovel is tilted for discharging the coal or other material rearward across the shovel shaft, F14, the coal will also fall rearward of the member, F17. A part of the coal will slide from the shovel during the rearward movement of the shovel; and during that time the coal falling on the cross plate, F7, will be pushed or scraped rearward on said cross plate by the cross member, F17. The rear part of the cross plate, F7, partially overlaps the forward part of the conveyor belt, and coal moved rearwardly from the cross member, F7, falls upon the conveyor.

The crank shaft, F42, is driven from the shaft, F50, (Figs. 2 and 5) through a spur gear wheel, F48, keyed on the right hand end of the shaft, F42, and the spur gear wheel, F49, keyed on the right hand end of the shaft, F50, said spur gear wheels intermeshing and the rotation of the shaft, F42, being clockwise, whereby the wrist pins, F47, are carried clockwise in advance of the wrist pins, F40, as above described, whereby the movements of the pitman rods, F44 and F34, are in advance of the movements of the pitman rods, F38, and the connecting plates, F15, as above described.

The right hand part of the shaft, F50, rests in a bearing, F51, which is supported on the right hand side rail, C4. A bearing F52, on the left hand side rail, C4, supports the left hand part of said shaft. An oblique bearing, F53, rests on the bridge member, C5. The bearings, F51 and F53, are joined by an oblique arm, F54. On the center casting, C3, is a bearing, F55, in alignment with the bearing, F53. An oblique shaft, F56, is supported in the bearings F53 and F55, each end of said shaft projecting through the adjacent bearing. On the forward end of the shaft, F56, is fixed a small bevel gear wheel, F57, which meshes with a larger bevel gear wheel, F58, surrounding and fixed on the shaft, F50. On the rear end of the shaft, F56, is fixed a bevel pinion, F59, which meshes with the larger bevel gear wheel, B, on the upright shaft, B1. The transmission of motion from the motor, M, to the upright shaft, B1, and said bevel gear wheel, B, is described under the heading, "Transmission from motor to main bevel wheel".

It is now to be observed that the shaft, F50, is driven continuously and continuously transmits motion through the spur gear wheels, F49, F48, and the crank shaft, F42, and that the connections between said crank shaft and the shovel are such as to continually put the shovel through its movements during the rotation of the crank shaft. Therefore, during the operation of the machine, the action of the shovel mechanism is continuous and automatic and at uniform velocity relative to the velocity of the shaft, F50.

The jib

The jib, C, comprises two sections, a rear section, C1, and a forward section, C2, the forward section being hinged to the rear section on a horizontal axis, whereby the forward end of the forward section may be raised and lowered, whereby the axial line on which the rear part of the shovel, F, is supported may be adjusted to different elevations.

The rear jib section, C1, has for its principal elements a center casting, C3, and two metal-channel-form side rails, C4, and a front transverse bridge member, C5. The forward transverse part, C6, of the casting C3, may be regarded as a bridge member. The rear part of said casting has oblique arms, C7, meeting at and supporting on the middle line of the frame an upright bearing, C8. (Figs. 2, 5, 6, 12, 13, 14, 18 and 24). The sides of this casting are straight and extend into the channels of the side rails, C4, the flanges of each side rail being directed toward the opposite side rail. Bolts, C9, extend through the upright webs of the side rails, C4, and the adjacent upright side, C10, of the center casting. In each forward corner of this casting is a roller, C12, having axles, C14, resting in bearings, C13. (Figs. 13 and 17). These rollers are to rest on and travel on the gear segment plate, C15, which is fixed on the forward part of the main frame, A, of the machine. The bearing, C8, loosely surrounds the upright shaft, B1, which is supported on the main frame as shown by Fig. 19. This support of the casting, C3, on the shaft or king pin, B1, and on the gear segment plate, C15, allows lateral turning of the casting, C3, and the entire jib on the axial line of the shaft, B1. Means for thus laterally moving the jib and holding it when it has been brought into a desired position will be described further on.

The transverse bridge member, C5, mentioned above, is a casting of angle-form cross section with one flange horizontal and the other flange turned downward at the forward edge of the horizontal flange. (Figs. 5, 13 and 14). The ends of this member are T-form and extend into the channels of the side rails, C4. Bolts, C17, extend through the end arms of this bridge member, C5, and through the upright web of the side rails, C4.

The bridge member, C28, is between the bridge member, C5, and the forward ends of the side rails, C4. This bridge member is of channel form with the web upright and the flanges directed rearward. (Figs. 13 and 14). At each end of the bridge member, C28, a gusset plate, C18, is placed on top of the member, C28, and the upper face of the adjacent side rail, C4, and secured to said members by means of bolts or rivets, C19.

Jib yoke

At the forward end of the side rails, C4, a bearing, C20, has an arm, C21, laid against the inner face of the rail, C4, and secured thereto by means of rivets, C22. A shaft, C23, extends from one of said bearings to the other and through said bearings and the rails, C4, and the adjacent plate, E4, each end of said shaft projecting far enough to also extend into or through the adjacent bearing, C25, on the yoke, C24, each such bearing being against the outer face of the adjacent side rail, C4. (Figs. 2, 5, 27, 28 and 29). Each of said bearings is extended upward on the yoke, C24, far enough and in the form of an ear to bring the yoke below the level of the side rails, C4.

The yoke, C24, is shown as a single steel casting comprising the horizontal, longitudinal arms, C27, and the transverse bridge member, C28, meeting the arms adjacent said bearings. (Figs. 28 and 29).

Rearward of said bridge member, C28, the yoke arms, C27, extend obliquely toward each other and meet to form a fork, C29, which has an upright slot, C30, and transverse horizontal bearings, C31, on a common axial line. This fork receives the lower end of a screw shaft, C32. (Figs. 2, 5 and 30). A pintle, C33, extends horizontally through the bearings, C31, and the lower end of said screw shaft. (Fig. 2).

On the bridge member, C5, midway between its ends, is a block, C34. (Figs. 5, 13 and 14) which is secured by upright bolts, C35, extending through said block and the horizontal flange of the bridge member, C5. On the front face of the bridge member, C6, (Figs. 13 and 14) midway between the side rails or on the middle longitudinal line of the frame is an ear, C36. Two bars, C37, are placed horizontally and at each side of and against the block, C34, and the ear, C36. Bolts, C38, extend horizontally through said bars and the block, C34, to bind said bars to said block. A bolt, C39, extends through the ear, C36, and the adjacent ends of said bars. In each of said bars and in the same horizontal axial line is a bearing, C40. Each of said bearings receives a journal, C41, on the swivel piece, C42. (Figs. 30, 31, 32 and 32a). Between said journals the swivel piece is tubular on an upright axis to form a bearing, C43, for the rotary nut, C44, having a shoulder, C45, seating on the annular shoulder, C46, formed in the upper end of the bearing, C43. Above the shoulder, C45, and integral with the upper end of the rotary nut, C44, is a miter gear wheel, C47, which meshes with the miter gear wheel, C48, which is fixed on the adjacent end of the shaft, C49, which projects through the horizontal bearing, C50, which is a part of the swivel piece, C42. At the end of said bearing opposite the wheel, C48, is a collar, C51, to limit movement of the shaft toward said bearing. (Figs. 30 and 31). The shaft, C49, extends through a bearing in a plate, C52, rising from the right hand side rail, C4. (Figs. 5 and 30). Said shaft extends through said plate and on said end is fixed the hand wheel, C53.

The interior of the nut, C44, is screw threaded to fit the threads of the screw shaft, C32. (Figs. 2 and 30).

It will now be seen that, by turning the hand wheel, C53, in one direction, the miter gear, C48, will cause the turning of the tubular nut, C44. That nut being held rotatably to prevent upward and downward movement in the swivel piece, C42, it follows that the screw shaft, C32, will be moved upward or downward, according to the direction of rotation of the hand wheel.

The tubular nut, C44, is divided transversely between its ends, and one of the meeting faces is provided with notches, C54, while the other of said faces is provided with teeth, C55, adapted to fit into said notches. (Figs. 30, 31 and 32a). For assembling, the upper part of said nut is seated in the upper part of the bearing, C43. Then the lower part of said nut is pushed upward into said bearing in position to cause the teeth, C55, to enter the notches, C54. Then the screw shaft is entered into the lower part of the nut and turned to cause it to move upward through the two sections or parts of said nut. When that has been done, the threads of the screw shaft hold the two parts of the nut together.

On the lower end of the nut, C44, is a circumferential flange, C56. Between that flange and the lower end of the swivel piece, C42, is placed a ball thrust bearing, C62, to resist upward movement of the rear end of the yoke and to permit easy turning of the tubular nut, C44. In a machine built according to this improvement, this yoke adjustment allows placing the shovel below the top of the rails on which the machine is supported, or the shovel can be raised considerably above the rails.

Between the forward ends of the parallel arms of the yoke, C24, is a bridge-form casting, C57, of angle cross section, one of the flanges being above and slanting to conform to the slant of the forward jib frame, and the other flange extending downward. (Figs. 33 and 34.) At each end this casting has a downward directed blade, C58, extending over the inner face of the adjacent arm of the yoke, C24, and secured thereto by rivets or bolts, C59. Approximately in the plane of this blade, C58, is an upward directed blade, C60. At the meeting of these two blades is an outward-directed flange, C61, which rests on the upper edge of the adjacent arm, C24, and forms an additional supporting means for the bridge-form casting, C57. This casting forms a support for the forward jib frame, said frame occupying the space between the two blades, C60, the upright flange of the rails, E5, of said frame resting loosely on the body of the bridge-form casting, C57, whereby sliding of said frame on said bridge is permitted.

*The jib conveyor structure*

The jib conveyor structure, E, is divided into a rear frame section, E1, and a forward frame section, E2. The main members of these frame sections are the side rails, E5. These rails are of angle cross section, one flange being upright at the side of the frame and the other flange being above and directed inward or toward the opposite side rail. The rear frame section, E1, of the conveyor structure is supported by rear side plates, E3, and forward side plates, E4, rising from and riveted to the side rails, C4, C4, and riveted to the side rails, E4, of the conveyor structure. The rear end of the forward frame section, E2, is hinged to the forward end of the rear frame section by means of a fork, E6, riveted to the rear end of each forward conveyor structure section side rail. Each fork is directed rearward and receives a tongue, E7, seated on the forward end of the adjacent side rail, E5, of the rear frame section. At each fork, E6, a bolt, E8, extends through the fork and the tongue, E7. The hinge thus formed constitutes the rear support for the forward frame section, E2. The forward part of the section, E2, as already described, rests loosely on the bridge-form casting, C57, between the upright blades, C60, said casting being rigid on the yoke, C24. This frame section is thus seated loosely on the bridge member, C57, to allow relative sliding between said bridge member and said frame section when the yoke, C24, is tilted by the raising or lowering of the screw shaft, C32, already described. The upper floor plate, E9, of each conveyor structure section rests on the horizontal flange of each side rail, E5, and is secured thereto by means of cap screws, E10, extending through the spring steel strip, E11, and the floor plate, E9, and into said flange. (Figs. 33 and 35).

*Conveyor apron or belt*

Figure 6A:
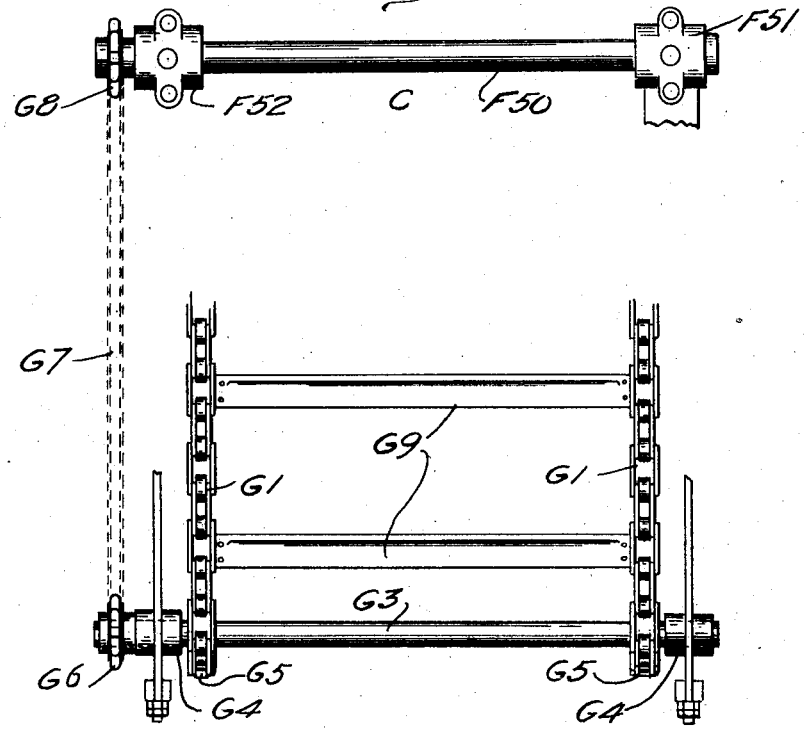
Fig. 6a is a plan of the rear part of the jib conveyor structure.
Figure 7:
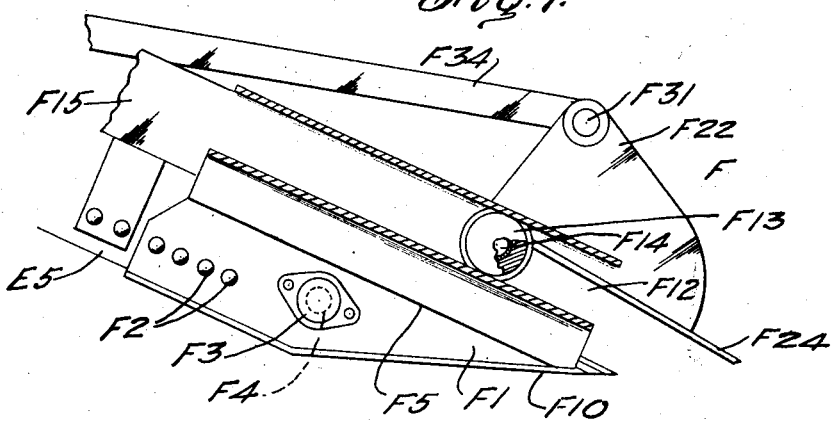
Fig. 7 is an upright longitudinal section on the line, 7—7, of Fig. 4, looking in the direction of the arrow.

At the forward end of the conveyor structure, at the inner end of each bearing, F3, (Figs. 8 and 9) a sprocket wheel, G, surrounds and is keyed to the shaft, F4. At the rear end of the jib conveyor structure is a transverse shaft, G3, seated in bearings, G4. On that shaft between the side rails of the conveyor structure, and near each rail are fixed sprocket wheels, G5. Sprocket chains, G1, of the endless conveyor belt or apron extend around the sprocket wheels, G and G5, at each side of the structure. The left hand end of the shaft, G3, projects outward through the adjacent bearing, G4. A sprocket wheel, G6, surrounds and is fixed to said end of said shaft. (Figs. 5 and 6a). A sprocket chain, G7, surrounds said wheel and the sprocket wheel, G8, on the outer end of the shaft, F50, which is rotatable in bearings, F51 and F52, on the side rails, C4, of the main jib frame, as already described. It is to be understood that the structure of this conveyor apron or belt may be varied to suit the material to be handled by the machine. The drawings show it composed of the chains, G1, G1, and transverse flights, G9.

*Moving jib sidewise*

The gear segment plate, C15, has already been described as being applied horizontally on the forward part of the main frame, A, and forming a track for the rollers, H. (Figs. 6, 17, 21, 25 and 25a).

A bridge casting, H1, extends from the left hand part of the forward edge of the bridge-form member, C6, of the casting, C3, forward to the left hand part of the bridge member, C5. (Figs. 5, 13, 14, 22 and 25). At its forward end this casting has a horizontal cross head, H2, resting flatwise on the bridge member, C5, and secured thereto by bolts, H3. The rear end of the casting, H1, has an upright cross head, H4, which bears flatwise against the adjacent upright forward face of the bridge casting, C6, and is secured thereto by means of cap screws, H5. Adjacent the cross head, H4, the casting, H1, has an upright bearing, H6, in which is a short shaft, H7, on the lower end of which is fixed a small spur gear wheel, H8, which meshes with the gear teeth on the segment gear plate, C15. Said shaft extends above the bearing, H6, far enough to receive a worm wheel, H9, which is keyed on said shaft. In bearings, H10, H10, seated on the bridge, H1, rests the worm shaft, H11, having a worm, H12, meshing with the worm wheel H9. Said shaft, H11, projects forward through the forward bearing, H10. A bevel friction wheel, H13, surrounds and is fixed on said end of said shaft. At opposite sides of the wheel, H13, and surrounding the shaft, F50, are two larger friction bevel gear wheels, H14 and H15, joined by a common hub, H16, the wheels, H14 and H15, being separated to allow them to be positioned without engaging the bevel gear wheel, H13. Said wheels and said hub are keyed on said shaft, F50, to permit endwise sliding on the shaft and to compel rotation with the shaft, so that said wheels rotate whenever the shaft rotates. On the right hand side of the friction wheel, H15, is a hub, H17, which has a circumferential channel which receives a shift-ring, H18, on which are radial studs H19, extending into the shift lever, H20. (Fig. 26). Said lever is duplex—composed of two bars one lying on the other and bolted or riveted together and separated to span the hub, H17, and each having a hole to receive one of the studs, H19, on the shift-ring, H18. At the forward end of said lever, (Figs. 5, 26, 2 and 2a) said bars are separated sufficiently to form a fork embracing the triangular bracket plate, H21, extending horizontally rearward from the bridge member, C28. At the rear end of the lever, the two bars are separated to form a fork to receive a swivel nut, H22, having diametrically opposite radial studs, H23, extending into bearings, H24, in the lever, H20. The swivel nut receives the threaded end of the screw-shaft, H25. The rear end of the upper bar of said lever is extended beyond the swivel nut to form a tongue, H26, to overlap the transverse rod, H27, which has its ends supported in the upright plates, E3, already described as supporting the rear end of the rear jib section. The outer or right hand end of the screw shaft, H25, extends rightward through the adjacent upright plate, E3. On each side of said plate, said shaft is surrounded by a fixed collar, H28, for holding the shaft against endwise movement. On the outer end of said shaft, H25, is a small sprocket wheel, H29, which is connected by a sprocket chain, H30, with a sprocket wheel, H31, on a short horizontal shaft, H32, resting in a bearing in a standard, H33, supported on the right-hand side of the forward conveyor frame. On the outer end of the shaft, H32, is fixed a hand wheel, H34.

By turning the hand wheel, H34, and thus through the sprockets and chain turning the shaft, H25, in one direction, the swivel nut, H22, and the lever, H20 are moved sidewise and the friction gear wheels H14 and H15, are moved endwise in one direction. The reverse movement of said parts takes place when said hand wheel is turned in the opposite direction. If the movement of the wheels, H14 and H15, is toward the left to engage the wheel, H15, with the wheel, H13, the wheel, H13, and the worm shaft, H11, and the worm, H12, and the wheels, H9 and H8, are turned for causing the wheel, H8, to traverse the segment gear, C15, in one direction, whereby the jib is moved in that direction. Movement of the jib in the opposite direction results when the friction wheels, H14 and H15, are moved so as to engage the wheel, H14, with the wheel, H13. When the jib is to be held at rest, the hand wheel and screw shaft, H25, are turned so as to bring both wheels, H14 and H15, out of engagement with the wheel, H13, the wheels, H14 and H15, being, as above stated, spaced from each other far enough to permit such disengagement. Then the wheel, H13, and the worm shaft, H11, and the worm, H12, are idle and said worm holds the worm wheel, H9, and the short shaft, H7, and the small spur gear wheel, H8, locked, whereby the jib is locked against sidewise movement.

*Transmission from motor to main bevel wheel*

The main bevel gear wheel, B, already described, meshes with the smaller bevel gear wheel, B2, fixed on the longitudinal, horizontal shaft, B3, resting in bearings, B4 and B5. (Figs. 2, 3, 6, 19, 20 and 20a). From the shaft, B3, there is transmission to the bevel gear wheel, B6, through the clutch members, B7 and B8, the wheel, B6, having a hub, B9, extending through the bearing, B5, and loosely surrounding the shaft, B3, and extending into and keyed to the clutch member, B7. The clutch member, B8, is keyed for endwise sliding on said shaft. An expanding coil spring, B10, surrounding the shaft, B3, between the hub of the clutch member, B8, and the nut, B11, normally presses the member, B8, into the member, B7. The member, B8, may be forced in the opposite direction by means of the lever, B12, pivoted at its upper end to the bracket, B13, and surrounding the hub of the clutch member, B8, and bearing a ring, B14, resting loosely in a circumferential groove in the hub of the member, B8, and joined to the lever by means of cross-pins, B15. Said bracket is fixed on the frame member, A4. By turning the lever, B12, forward or toward the spring, B10, the clutch member, B8, is moved out of engagement with the clutch member, B7.

To the lower end of the lever, B12, is coupled the rear end of a horizontal link, B16, (Fig. 20) extending forward and surrounding an eccentric, B17, on a horizontal shaft, B18, on the outer or right hand end of which is the upright hand lever, B19. By means of said hand lever and eccentric, the link, B16, may be shifted horizontally, as will now be understood.

The bevel gear wheel, B6, meshes with a bevel gear wheel, B20, on the horizontal cross-shaft, B21, resting in a left hand bearing, B22, and a right hand bearing, B23. (Fig. 6). The right hand end of said shaft projects through said bearing. On said end is fixed a large spur gear wheel, B24, which meshes with a smaller spur gear wheel, B25, which is fixed on the shaft of the electric motor, M. When the motor is in motion, there is constant transmission of motion through the shaft, B21, and the bevel wheel, B20, to the bevel gear wheel, B6. From that wheel, motion is transmitted to the shaft, B3, by allowing the clutch member, B8, to engage the clutch member, B7.

*Driving the track wheel axles*

The track wheels, A1, receive motion from the shaft, B21, through the bevel gear wheels, B26, and B27, these wheels being free to turn on said shaft, but held against endwise movement. (Fig. 6). On the wheel, B26, is fixed a friction clutch cup, B28, into which extends a conical clutch member, B29. On the wheel, B27, is fixed a friction clutch cup, B30. Into that member extends a cone clutch member, B31. The cone members, B29 and B31, are joined to each other by a common hub, B32, keyed for sliding on the shaft and on which hub is a circumferential groove, B33, in which loosely engages a ring, B34, which is engaged by the arms of a lever, B35, which is pivoted between its ends to a frame member at B36. By tilting said lever, the two cone members, B29 and B31, are moved in unison toward the right or toward the left, according to the direction of movement of said lever. Thus clutch engagement may be made for rotating either the bevel gear wheel, B26, or the bevel gear wheel, B27. Both of said bevel gear wheels are in mesh with the bevel gear wheel, B37, (Fig. 38) which is located below the clutch and is keyed on the upright shaft, B38, on the lower part of which is the worm, B39, which meshes with the worm wheel, B40, which surrounds and is keyed on the horizontal transverse shaft, B41, which is horizontal and parallel to and a little rearward of the shaft, B21. The shaft, B41, projects outward at the left side of the machine and there bears a sprocket wheel, B42. The adjacent end of the rear wheel axle, A3, projects outward at the left and has fixed on it a sprocket wheel, B43. A sprocket chain, B44, extends around said sprocket wheels. The opposite end of said rear axle projects outward at the right and receives a sprocket wheel, B45. The right hand end of the forward axle, A3, projects similarly and has fixed thereon a sprocket wheel, B45. A sprocket chain, B46, is mounted on these sprocket wheels, B45, B45. When the shaft, B41, is rotated, the two axles, A3, and the track wheels, A1, are rotated through the action of the sprocket chains, B44 and B46, the direction depending upon whether transmission is through the bevel gear wheel, B26, or B27, on the shaft, B21.

The forward end of the lever, B35, is coupled to the left hand end of the horizontal piston stem, B48, which extends into the hydraulic cylinder, B47. (Fig. 37). From the cylinder, B47, two flexible tubes, B49 and B50, extend to the hydraulic cylinder, B51. Connected with the piston stem, B52, of the cylinder, B51, is an upright hand lever, B53, by means of which said piston stem may be reciprocated, whereby there is transmission through the tubes, B49 and B50, for reciprocating the piston stem, B48, of the cylinder, B47. The hand lever is near the operator's seat, B57. By means of said hand lever, the operator may at will propel the machine forward and backward, as may be needed for taking the machine toward or from the place of operation or as may be needed during the operation of the machine.

The operator's seat, B57, rests on the seat support, B54, which is fixed on the seat platform, B55. Near the seat is the electric controller, B56, joined by suitable wiring to the electric motor, M.

Regarding the action of the shovel on the coal or other material, it is to be observed that the shovel is not given such a movement as tends to pitch the coal rearward vigorously with such force as to break the coal. The shovel is moved bodily rearward, and during such movement the shovel is slowly turned from its approximately horizontal load-taking position to an inclination allowing easy sliding of the coal from the shovel bottom, the shovel having, as above described, a bottom and sides and being open at the rear.

Placing the shovel axis substantially at the rear end of the shovel, and not distant from the shovel, is an aid to effecting the turning without giving to any part of the shovel a turning velocity which will pitch the coal.

As indicated in the foregoing description in connection with the drawings, the coal sliding from the shovel moves in front of the plate-form cross member, F17, which is carried on the connecting plates, F15, along with the shovel. Some of the coal may slide onto the stationary cross-plate, F7, while other coal slides directly onto the conveyor. Any coal sliding onto the cross plate will be pushed rearward onto the conveyor by the cross member, F17.

The shovel open at the rear and comprising the rigid sides and the approximately flat bottom constitutes a structure functioning as a chute or slide when moved bodily rearward relative to the adjacent structure and tilted backward.

I claim as my invention,

1. In a shoveling machine, the combination with a supporting structure, means forming guide-ways at each side of the forward end of the supporting structure, conveyor means located below said guide-ways, a shovel having sides and a bottom, means supporting the rear lower part of the shovel to permit turning and bodily reciprocation of the shovel along the guide-ways, a plate-form cross member located between the shovel and the forward part of the conveyor means, a connecting member located adjacent each guide-way and in operative relation with the rear lower part of the shovel for reciprocating the shovel along the guide-ways, a connecting member coupled to the upper part of each shovel side, and power-driven means for reciprocating said several connecting members.

2. In a shoveling machine, the combination with a supporting structure, means forming guide-ways at each side of the forward end of the supporting structure, conveyor means located below said guide-ways, a shovel having sides and a bottom, means supporting the rear lower part of the shovel to permit turning and bodily reciprocation of the shovel along the guide-ways, a plate-form cross member located between the shovel and the forward part of the conveyor means, a connecting member located adjacent each guide-way and in operative relation with the rear lower part of the shovel for reciprocating the shovel along the guide-ways, a connecting member coupled to the upper part of each shovel side, and power-driven means including bell cranks for reciprocating said several connecting members.

3. In a shoveling machine, the combination with a supporting structure, means forming guide-ways at each side of the forward end of the supporting structure, conveyor means located below said guide-ways, a shovel having sides and a bottom, means including a shaft for supporting the rear lower part of the shovel to permit turning and bodily reciprocation of the shovel along the guide-ways, a connecting member located adjacent each guide-way and in operative relation with the rear lower part of the shovel for reciprocating the shovel along the guide-ways, an upright cross plate located between and supported by said connecting members adjacent the shovel and reciprocable with said connecting members and the shovel, a connecting member coupled to the upper part of each shovel side, and power-driven means for reciprocating said several connecting members.

4. In a shoveling machine, the combination with a supporting structure, means forming guide-ways at each side of the forward end of the supporting structure, conveyor means located below said guide-ways, a shovel having sides and a bottom, means including a shaft for supporting the rear lower part of the shovel to permit turning and bodily reciprocation of the shovel along the guide-ways, a plate-form cross member located between the shovel and the forward part of the conveyor means in a plane approximately parallel to the plane of said guide-ways, a connecting member located adjacent each guide-way and in operative relation with the rear lower part of the shovel for reciprocating the shovel along the guide-ways, an upright cross plate located between and supported by said connecting members adjacent the shovel and reciprocable with said connecting members and the shovel and extending downward to the plate-form cross member, a connecting member coupled to the upper part of each shovel side, and power-driven means for reciprocating said several connecting members.

5. In a shoveling machine, the combination with a supporting structure, side plates forming guide-ways and conveyor shaft bearings below said guide-ways at each side of the forward end of the supporting structure, a conveyor shaft in said bearings, a conveyor belt on said shaft, a shovel having sides and a bottom, means supporting the rear lower part of the shovel to permit turning and bodily reciprocation of the shovel along the guide-ways, a plate-form cross member located between the shovel and the forward part of the conveyor belt in a plane approximately parallel to the plane of said guide-ways, a connecting member located adjacent each guide-way and in operative relation with the rear lower part of the shovel for reciprocating the shovel along the guide-ways, an upright cross plate located between and supported by said connecting members adjacent the shovel and reciprocable with said connecting members and the shovel and extending downward to the plate-form cross member, a connecting member coupled to the upper part of each shovel side, and power-driven means for reciprocating said several connecting members.

6. In a shoveling machine, the combination with a supporting structure, means forming guide-ways at each side of the forward end of the supporting structure, conveyor means located below said guide-ways, a shovel having sides and a bottom, means supporting the rear lower part of the shovel to permit turning and bodily reciprocation of the shovel along the guide-ways, a connecting member located adjacent each guide-way and in operative relation with the rear lower part of the shovel for reciprocating the shovel along the guide-ways, a connecting member coupled to the upper part of each shovel side, a power-driven crank shaft, and means including bell cranks connecting the crank shaft and said several connecting members for reciprocating and turning said shovel.

7. In a shoveling machine, the combination with a supporting structure, means forming guide-ways at each side of the forward end of the supporting structure, conveyor means located below said guide-ways, a bottom plate located below said guide-ways and said conveyor means, a plate-form approximately horizontal cross member between the guide-ways and the conveyor means, a shovel having sides and a bottom, and power-driven means engaging the rear part of the shovel for bodily reciprocating the shovel along said guide-ways and turning the shovel during such reciprocation.

8. In a shoveling machine, the combination with a supporting structure, means forming guide-ways at each side of the forward end of the supporting structure, conveyor means located below said guide-ways, a shovel having sides and a bottom, means supporting the rear lower part of the shovel to permit turning and bodily reciprocation of the shovel along the guide-ways, a connecting member located adjacent each guide-way and in operative relation with the rear lower part of the shovel for bodily reciprocating the shovel along the guide-ways, a connecting member coupled to the upper part of each shovel side, bell cranks coupled to said several connecting members, a crank-shaft, pitman rods coupled to the crank-shaft and to the bell cranks, and power-driven means for rotating the crank-shaft.

9. In a shoveling machine, the combination with a supporting structure, means forming guide-channels at each side of the forward end of the supporting structure, conveyor means located below said guide-channels, a shovel having sides and a bottom, means including a shaft having its ends resting loosely in said channels and supporting the rear lower part of the shovel to permit turning and bodily reciprocation of the shovel along the guide-channels, a stationary plate-form cross member between the shovel and the forward part of the conveyor means, a connecting member located adjacent each guide-channel and in operative relation with the lower part of the shovel for reciprocating the shovel along the guide-channels, an upright cross plate located between and supported by said connecting members adjacent the shovel and reciprocable with said connecting members and the shovel and extending downward to the plate-form cross member, connecting members in operative relation with the rear upper parts of the shovel, and means for reciprocating said several connecting members.

10. In a shoveling machine, the combination of a shovel, a power-driven rotary crank-shaft having double cranks bearing crank-pins offset from each other and one set in angular advance of the other, bell-cranks, rods connecting said crank-pins to said bell-cranks, and other members connecting the bell-cranks with the shovel for the bodily reciprocation and simultaneous partial turning of the shovel.

11. In a shoveling machine, the combination of a shovel, a power-driven rotary crank-shaft having double cranks each bearing a crank-pin, one being set in angular advance of the other, bell-cranks, rods connecting said crank-pins to the bell-cranks, and other members connecting the bell-cranks with the shovel for the automatic bodily reciprocation and simultaneous partial turning of the shovel.

12. In a shoveling machine, the combination of a shovel, shovel-actuating mechanism comprising a crank-shaft having double cranks each bearing a crank-pin, one being set in angular advance of the other, bell-cranks, rods connecting said pins to the bell-cranks, and other members connecting the bell-cranks with the shovel for the continuous automatic bodily reciprocation and simultaneous partial turning of the shovel.

13. In a shoveling machine, the combination with a supporting structure, of a shovel, means forming guide-ways for guiding the shovel for approximately horizontal reciprocation, a cross plate below the guide-ways and below the path of the shovel, power-actuated crank mechanism, means placing said crank mechanism into operative relation with the shovel to impart to the shovel a continuous automatic reciprocating and partial turning movement along said guideways.

14. In a shoveling machine, the combination with a supporting structure and a shovel open at each end and comprising rigid sides and an approximately flat bottom adapted to go under lading material during approximately horizontal forward movement and forming a slide when tilted backward, of means including reciprocatory connecting members in operative relation with the upper and the lower rear parts of the shovel for bodily reciprocating the shovel relative to adjacent structure and turning the shovel during such reciprocation.

15. In a shoveling machine, the combination with a supporting structure and a shovel open at each end and comprising rigid sides and an approximately flat bottom adapted to go under lading material during approximately horizontal forward movement and forming a slide when tilted backward, of means including reciprocatory connecting members in operative relation with the upper and the lower rear parts of the shovel for bodily reciprocating the shovel relative to adjacent structure and turning the shovel during such reciprocation, the reciprocation of the upper connecting members being in advance of the reciprocation of the lower connecting members.

16. In a shoveling machine, the combination with a supporting structure, of side plates forming approximately horizontal guide-ways at each side of the forward end of the supporting structure, a shovel open at each end and comprising rigid sides and an approximately flat bottom adapted to go under lading material during approximately horizontal forward movement and forming a slide when tilted backward, means including reciprocatory members in operative relation with the upper and the lower rear parts of the shovel for bodily reciprocating the shovel along said guideways and turning the shovel during such reciprocation.

17. In a shoveling machine, the combination with a supporting structure, of side plates forming approximately horizontal guide-ways at each side of the forward end of the supporting structure, a shovel open at each end and comprising rigid sides and an approximately flat bottom adapted to go under lading material during approximately horizontal forward movement and forming a slide when tilted backward, means including reciprocatory members in operative relation with the upper and the lower rear parts of the shovel for bodily reciprocating the shovel along said guide-ways and turning the shovel during such reciprocation, the reciprocation of the upper connecting members being in advance of the reciprocation of the lower connecting members.

18. In a shoveling machine, the combination with a supporting structure, means forming approximately horizontal guide-ways at each side of the forward end of the supporting structure, conveyor means located below said guide-ways, a shovel open at each end and comprising rigid sides and an approximately flat bottom adapted to go under lading material during approximately horizontal forward movement and forming a slide when tilted backward, means supporting the rear lower part of the shovel to permit turning and bodily reciprocation of the shovel along the guide-ways, a connecting member located adjacent each guide-way and in operative relation with the rear lower part of the shovel for reciprocating the shovel along the guide-ways, a connecting member coupled to the upper part of each shovel side, and power-driven means for reciprocating said several connecting members.

19. In a shoveling machine, the combination with a supporting structure, means forming approximately horizontal guide-ways at each side of the forward end of the supporting structure, conveyor means located below said guide-ways, a shovel open at each end and comprising rigid sides and an approximately flat bottom adapted to go under lading material during approximately horizontal forward movement and forming a slide when tilted backward, means supporting the rear lower part of the shovel to permit turning and bodily reciprocation of the shovel along the guide-ways, a connecting member located adjacent each guide-way and in operative relation with the rear lower part of the shovel for reciprocating the shovel along the guide-ways, a connecting member coupled to the upper part of each shovel side, and power-driven means including bell cranks for reciprocating said several connecting members.

20. In a shoveling machine, the combination with a supporting structure, means forming approximately horizontal guide-ways at each side of the forward end of the supporting structure, conveyor means located below said guide-ways, a shovel open at each end and comprising rigid sides and an approximately flat bottom adapted to go under lading material during approximately horizontal forward movement and forming a slide when tilted backward, means including a shaft for supporting the rear lower part of the shovel to permit turning and bodily reciprocation of the shovel along the guide-ways, a connecting member located adjacent each guide-way and in operative relation with the rear lower part of the shovel for reciprocating the shovel along the guide-ways, a connecting member coupled to the upper part of each shovel side, and power-driven means for reciprocating said several connecting members.

21. In a shoveling machine, the combination with a supporting structure, means forming approximately horizontal guide-ways at each side of the forward end of the supporting structure, conveyor means located below said guide-ways, a shovel open at each end and comprising rigid sides and an approximately flat bottom adapted to go under lading material during approximately horizontal forward movement and forming a slide when tilted backward, means supporting the rear lower part of the shovel to permit turning and bodily reciprocation of the shovel along the guide-ways, a connecting member located adjacent each guide-way and in operative relation with the rear lower part of the shovel for reciprocating the shovel along the guide-ways, a connecting member coupled to the upper part of each shovel side, a power-driven crank shaft, and means connecting the crank shaft and said several connecting members for reciprocating and turning said shovel.

22. In a shoveling machine, the combination with a supporting structure, means forming approximately horizontal guide-channels at each side of the forward end of the supporting structure, conveyor means located below said guide-channels, a shovel open at each end and comprising rigid sides and an approximately flat bottom adapted to go under lading material during approximately horizontal forward movement and forming a slide when tilted backward, means including a shaft having its ends resting loosely in said channels and supporting the rear lower part of the shovel to permit turning and bodily reciprocation of the shovel along the guide-channels, a connecting member located adjacent each guide-channel and in operative relation with the lower part of the shovel for reciprocating the shovel along the guide-channels, connecting members in operative relation with the rear upper parts of the shovel, and means for reciprocating said several connecting members.

23. In a shoveling machine, the combination with a supporting structure, means forming approximately horizontal guide-ways at each side of the forward end of the supporting structure, conveyor means located below said guide-ways, a shovel open at each end and comprising rigid sides and an approximately flat bottom adapted to go under lading material during approximately horizontal forward movement and forming a slide when tilted backward, means supporting the rear lower part of the shovel to permit turning and bodily reciprocation of the shovel along the guide-ways, a crank shaft bearing at each end two cranks one being set in advance of the other, means operatively connecting the advance crank with the rear upper part of each shovel side, and means connecting the rear cranks with the rear lower part of the shovel for bodily reciprocating the shovel relative to adjacent structure.

24. In a shoveling machine, the combination with a supporting structure, means forming approximately horizontal guide-ways at each side of the forward end of the supporting structure, conveyor means located below said guide-ways, a shovel open at each end and comprising rigid sides and an approximately flat bottom adapted to go under lading material during approximately horizontal forward movement and forming a slide when tilted backward, means supporting the rear lower part of the shovel to permit turning and bodily reciprocation of the shovel along the guide-ways connecting members coupled to the upper parts of the shovel sides, other connecting members in operative relation with the lower part of the shovel, a crank shaft in operative relation with said several connecting members for reciprocating said members, and a motor in operative relation with said crank shaft for continuously rotating said shaft.

25. In a shoveling machine, the combination with a supporting structure comprising a main part resting on the body of the machine for turning sidewise and comprising a yoke hinged to said main supporting structure part on a transverse horizontal line and comprising a conveyor structure jointed between its ends on a transverse horizontal line and having its forward section resting on the forward end of the yoke, operator-controlled means for tilting the yoke, a shovel open at each end and comprising rigid sides and an approximately flat bottom adapted to go under lading material during approximately horizontal forward movement and forming a slide when tilted backward, and power-actuated means in operative relation with the rear end of the shovel for automatically reciprocating and turning the shovel relative to adjacent structure.

26. In a shoveling machine, the combination with a supporting structure and a shovel open at each end and comprising rigid sides and an approximately flat bottom adapted to go under lading material during approximately horizontal forward movement and forming a slide when tilted backward, of power-actuated means in operative relation with the rear part of the shovel on different transverse lines for bodily reciprocating the shovel relative to adjacent structure and turning the shovel during such reciprocation.

27. In a shoveling machine, the combination with a supporting structure, of a conveyor, a shovel open at each end and comprising rigid sides and an approximately flat bottom adapted to go under lading material during approximately horizontal forward movement and forming a slide when tilted backward, power-actuated rotary crank mechanism comprising two cranks, one in advance of the other, and means placing said crank mechanism into operative relation with the rear part of the shovel for imparting a continuous automatic bodily reciprocation relative to the conveyor and partial turning to the shovel.

28. In a shoveling machine, the combination with a supporting structure, of a shovel open at each end and comprising rigid sides and an approximately flat bottom adapted to go under lading material during approximately horizontal forward movement and forming a slide when tilted backward, power-actuated rotary crank mechanism comprising two cranks, means connecting one of said cranks to the lower part of the rear end of the shovel, and means for connecting the other of said cranks to the upper parts of the sides of the shovel, whereby the shovel is given continuous automatic bodily reciprocation and partial turning.

29. In a shoveling machine, the combination of a shovel open at each end and comprising rigid sides and an approximately flat bottom adapted to go under lading material during approximately horizontal forward movement and forming a slide when tilted backward, a power-actuated crank-shaft bearing at each end two crank-pins, one being set in advance of the other, and means connecting the crank-pins to the rear end of the shovel at different elevations to impart to said shovel a simultaneous reciprocating and partial turning movement.

30. In a shoveling machine, the combination of a shovel open at each end and comprising rigid sides and an approximately flat bottom adapted to go under lading material during approximately horizontal forward movement and forming a slide when tilted backward, means forming approximately horizontal guide-ways for guiding the shovel for approximately horizontal reciprocation, a power-actuated crank-shaft having cranks with two crank-pins, one set in advance of the other, and means connecting the crank-pins to the rear end of the shovel at different elevations to impart to said shovel a continuous automatic simultaneous reciprocating and partial turning movement along said guide-ways.

31. In a shoveling machine, the combination with a supporting structure, of a conveyor, power-driven crank mechanism, a shovel open at each end and comprising rigid sides and an approximately flat bottom adapted to go under lading material during approximately horizontal forward movement and forming a slide when tilted backward, means operatively connecting said crank mechanism and the shovel on a transverse axis at the rear end of the shovel bottom for moving the shovel bodily forward and backward relative to the conveyor, and other means operatively connecting the crank mechanism with the upper part of the shovel for partially turning the shovel.

32. In a shoveling machine, the combination with a supporting structure, of a shovel open at each end and comprising rigid sides and an approximately flat bottom adapted to go under lading material during approximately horizontal forward movement and forming a slide when tilted backward, means forming guide-ways which are approximately horizontal and stationary relative to the shovel, reciprocatory power-driven means engaging the shovel at the lower rear part of the bottom and slidably engaging said guide-ways for bodily moving the shovel forward and backward relative to said guide-ways, and power-driven reciprocatory means engaging the upper part of the shovel for partially turning said shovel.

33. In a shoveling machine, the combination with a supporting structure, of a shovel open at each end and comprising rigid sides and an approximately flat bottom adapted to go under lading material during approximately horizontal forward movement and forming a slide when tilted backward, means forming guide-ways which are approximately horizontal and stationary relative to the shovel, reciprocatory power-driven means engaging the shovel at the lower rear part of the bottom and slidably engaging said guide-ways for bodily moving the shovel forward and backward relative to said guide-ways, and power-driven reciprocatory means engaging the upper part of the shovel for partially turning said shovel during the bodily forward and backward movement of the shovel.

34. In a shoveling machine, the combination with a supporting structure, of a shovel open at each end and comprising rigid sides and an approximately flat bottom adapted to go under lading material during approximately horizontal forward movement and forming a slide when tilted backward, power-driven means operatively connected with the lower part of the shovel for moving the shovel horizontally bodily forward and backward, and other power-driven means operatively connected with the shovel for slowly turning the shovel from the load-taking position upward and rearward into inclined position permitting sliding of the coal from the shovel.

35. In a shoveling machine, the combination with a supporting structure, of a shovel open at each end and comprising rigid sides and an approximately flat bottom adapted to go under lading material during approximately horizontal forward movement and forming a slide when tilted backward, reciprocatory power-driven means engaging the shovel at the lower rear part of the bottom for bodily moving the shovel forward and backward horizontally, and power-driven reciprocatory means engaging the upper part of the shovel for partially turning said shovel, the rearward turning of the shovel beginning prior to the beginning of the bodily rearward movement.

36. In a shoveling machine, the combination with a supporting structure, of a first power-actuated reciprocatory means in an approximately horizontal plane, a shovel open at each end and having its lower rear part coupled to said reciprocatory means and comprising rigid sides and an approximately flat bottom forming a slide when tilted backward, and another power-actuated reciprocatory means engaging the upper part of the shovel for tilting the shovel rearward during the rearward movement of said first reciprocatory means.

37. In a shoveling machine, the combination with a supporting structure, of a first power-actuated reciprocatory means in an approximately horizontal plane, a shovel open at each end and having its lower rear part coupled to said reciprocatory means and comprising rigid sides and an approximately flat bottom forming a slide when tilted backward, another power-actuated reciprocatory means engaging the upper part of the shovel for tilting the shovel rearward during the rearward movement of said first reciprocatory means, a cross plate below the path of the shovel, and a cross member located between the cross plate and the rear part of the shovel and movable with the shovel.

In testimony whereof I have signed my name, this 16th day of November, in the year one thousand nine hundred and twenty-nine.

WILLIAM WHALEY.